(12) United States Patent
Yun et al.

(10) Patent No.: US 11,849,475 B2
(45) Date of Patent: *Dec. 19, 2023

(54) LOCATING EXTERNAL INTERFERENCE IN A WIRELESS NETWORK

(71) Applicant: Spectrum Effect Inc., Kirkland, WA (US)

(72) Inventors: Jungnam Yun, Kirkland, WA (US); Eamonn Gormley, Kirkland, WA (US)

(73) Assignee: SPECTRUM EFFECT INC., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,912

(22) Filed: Dec. 21, 2022

(65) Prior Publication Data

US 2023/0189313 A1 Jun. 15, 2023

Related U.S. Application Data

(63) Continuation of application No. 17/072,977, filed on Oct. 16, 2020, now Pat. No. 11,540,295, which is a continuation of application No. 16/703,293, filed on Dec. 4, 2019, now Pat. No. 10,813,102, which is a continuation-in-part of application No. 16/591,523, filed on Oct. 2, 2019, now Pat. No. 11,101,903, which is a continuation-in-part of application No. 16/211,181, filed on Dec. 5, 2018, now Pat. No. 10,605,890.

(60) Provisional application No. 62/839,730, filed on Apr. 28, 2019.

(51) Int. Cl.
*H04W 24/08* (2009.01)
*H04W 72/541* (2023.01)
*H01Q 1/24* (2006.01)
*H04B 17/318* (2015.01)
*H04W 64/00* (2009.01)

(52) U.S. Cl.
CPC .......... *H04W 72/541* (2023.01); *H01Q 1/246* (2013.01); *H04B 17/318* (2015.01); *H04W 24/08* (2013.01); *H04W 64/00* (2013.01)

(58) Field of Classification Search
CPC ........ H04W 24/10; H04W 4/02; H04W 88/08
See application file for complete search history.

(56) References Cited

U.S. PATENT DOCUMENTS

| | | | |
|---|---|---|---|
| 2010/0178925 A1* | 7/2010 | Bernini | H04W 16/18 455/446 |
| 2011/0282578 A1* | 11/2011 | Miksa | G06F 16/29 701/532 |
| 2016/0191121 A1* | 6/2016 | Bell | H02J 50/402 307/104 |
| 2022/0012533 A1* | 1/2022 | Yue | G06N 3/08 |

* cited by examiner

*Primary Examiner* — Sam Bhattacharya

(57) ABSTRACT

A method for locating a source of interference external to a wireless telecommunications network includes assigning first and second elevation values to each pixel in a grid of pixels that represents an area associated with a plurality of cellular antennas, and calculating at least one probability value that the source of interference external to the wireless telecommunications network is located at an associated pixel by calculating respective probability values for pixels in the grid using the first elevation value and the second elevation value of the associated pixel and vertical gain values for each of the plurality of cellular antennas.

20 Claims, 30 Drawing Sheets

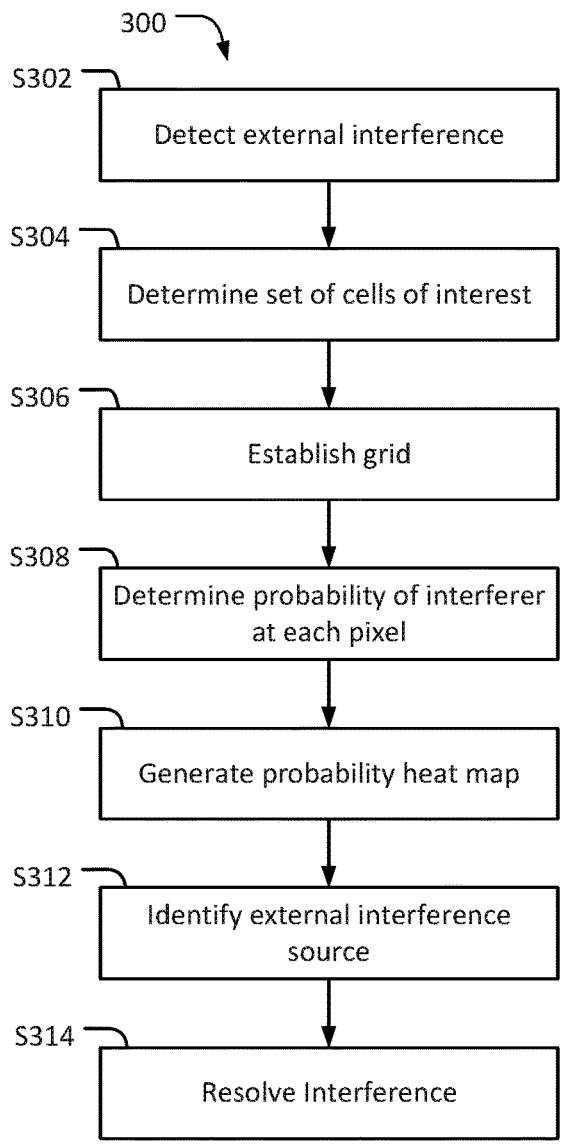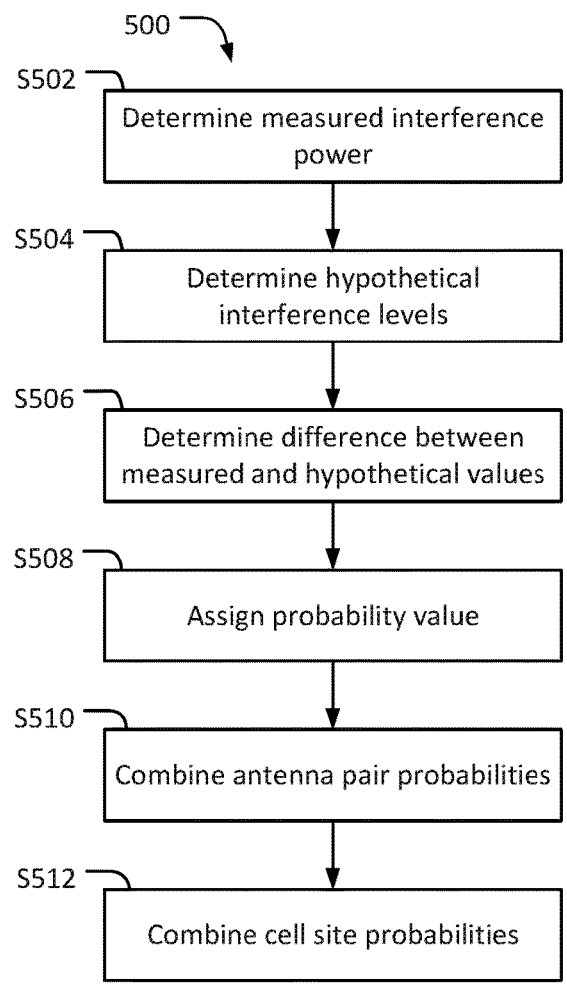
FIG. 3
FIG. 5

- S2402: Determine topography of pixel grid area
- S2404: Assign elevation to pixels
- S2406: Determine vertical characteristics of antennas
- S2408: Calculate AoA in vertical dimension
- S2410: Determine vertical gain
- S2412: Combine vertical and horizontal gain

FIG. 25

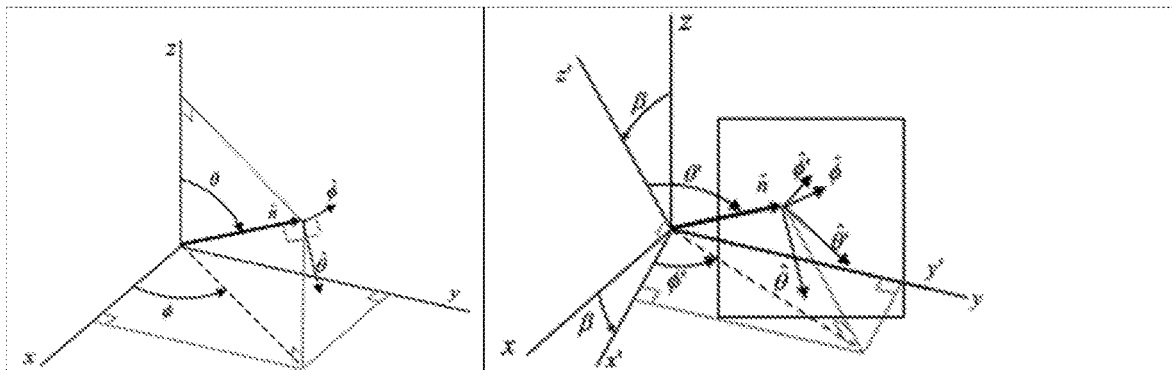

| Mechanical tilt = 0 | Mechanical Tilt: $\beta$ |
| Antenna azimuth = X axis | Antenna Azimuth: X axis |
| $AoA_H(\phi) = \phi \ (degree)$ $AoA_V(\varphi) = \theta - 90 \ (degree)$ | $AoA_H(\phi') = \arg(cos\phi cos\beta sin\theta - cos\theta sin\beta$ $+ j sin\theta sin\phi) \ (degree)$ $AoA_V(\varphi') = \theta' - 90$ $= acos(sin\theta sin\beta cos\phi + cos\theta cos\beta)(degree)$ |

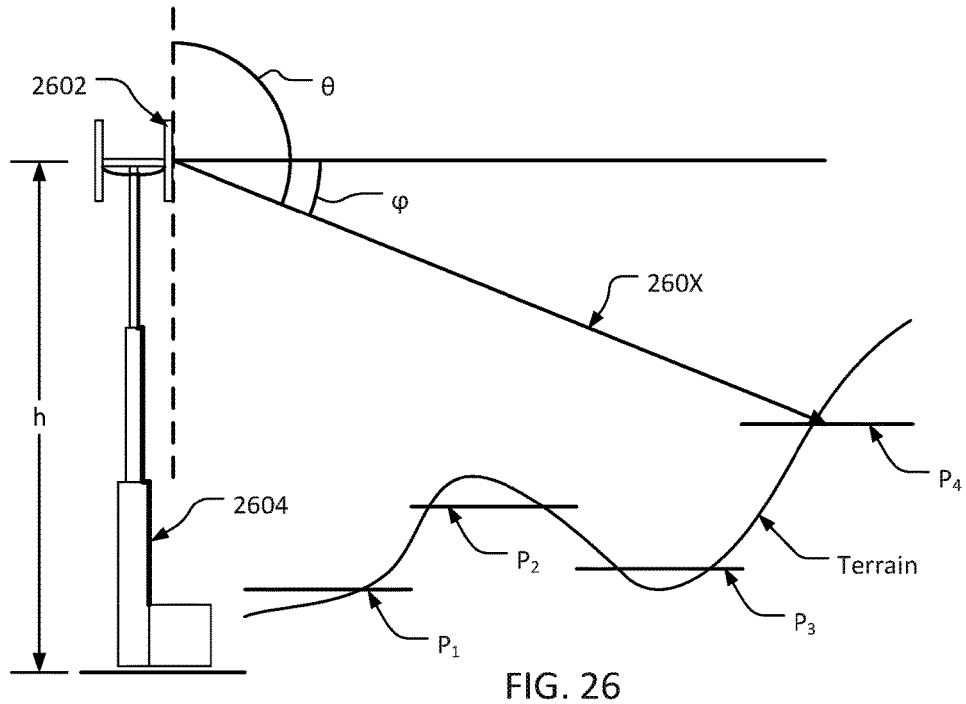

| Direction | Antenna Gain | Parameters |
|---|---|---|
| Horizontal | $A_H(\phi) = -\min\left(12\left(\frac{\phi}{\phi_{H,3dB}}\right)^2, A_m\right)$ | $\phi$: Horizontal Angle of Arrival (after mechanical Tilt ($\beta$) is applied)<br><br>$\phi_{H,3dB}$ = Horizontal 3dB Beamwidth<br><br>$A_m$ = Front-to-back ratio (e.g., 25dB) |
| Vertical | $A_V(\varphi) = -\min\left(12\left(\frac{(\varphi - \varphi_{etilt})}{\varphi_{V,3dB}}\right)^2, SLA_V\right)$ | $\theta$: Vertical Angle of Arrival (after mechanical Tilt ($\beta$) is applied)<br><br>$\theta_{etilt}$: Antenna Electrical Tilt<br><br>$\theta_{V,3dB}$ = Vertical 3dB Beamwidth<br><br>$SLA_V$ = Front-to-back ratio (e.g., 20dB) |
| 3D | $A(\phi, \varphi) = -\min(-[A_H(\phi) + A_V(\varphi)], A_m)$ | |

LOCATING EXTERNAL INTERFERENCE IN A WIRELESS NETWORK

CROSS-REFERENCES TO RELATED APPLICATIONS

This present application is a continuation of U.S. patent application Ser. No. 17/072,977, filed Oct. 16, 2020, and issued as U.S. Pat. No. 11,540,295 on Dec. 27, 2022, which is a continuation of U.S. patent application Ser. No. 16/703, 293, filed Dec. 4, 2019, and issued as U.S. Pat. No. 10,813, 102 on Oct. 20, 2020, which is a continuation-in-part of U.S. patent application Ser. No. 16/591,523, filed Oct. 2, 2019, and issued as U.S. Pat. No. 11,101,903 on Aug. 24, 2021, which claims priority to U.S. Provisional Application No. 62/839,730, filed Apr. 28, 2019, and is a continuation-in-part of U.S. patent application Ser. No. 16/211,181, filed Dec. 5, 2018, and issued as U.S. Pat. No. 10,605,890 on Mar. 31, 2020, which are incorporated by reference herein.

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference limited environments where signal quality to and from network subscriber devices is limited in part by interference from other users served by the same or nearby cells. The design and optimization of these networks are based on having clear spectrum occupied only by radio frequency transmitting equipment associated with the specific network. However, this ideal of clear spectrum occupied only by intended users of the system is not always achieved.

Real world systems often experience unexpected network interference which may originate from radio frequency (RF) generating sources that are not otherwise associated with a licensed wireless network. These potential interference sources include many things such as industrial machinery, electronics test equipment radiating signals in the bands of interest, undesired mixing products generated by the licensed system itself and illegal radio sources. The result of these system interference sources is degraded system service and reduced wireless network capacity and coverage as the intentional signals suffer capacity and quality losses due to these interferers.

After determining that external interference is present, geo-location techniques can be used to characterize and locate a source of the interference. Another common application for geo-location techniques is to locate a 911 caller.

Various geo-location techniques, such as, Time-of-Arrival (TOA) and Time-Difference-of-Arrival (TDOA) techniques, Power-of-Arrival (POA) and Power-Difference-of-Arrival (PDOA) techniques, Frequency-Difference-of-Arrival (FDOA) techniques, and Angle-of-Arrival (AoA) geolocation techniques have been widely used to detect and locate radio signal emitters. However, measured time or frequency-based techniques require a precise timing source such as a common clock or a common frequency reference, which is not typically present for external interference sources.

POA or PDOA can be used to detect and locate an external interference source by collecting power measurement data from three or more receivers with known locations. However, the accuracy of conventional measured power-based techniques is highly limited by fading and shadowing in the radio environment, and may require additional measurement systems to collect the measured power data in order to make an accurate location determination.

TECHNICAL FIELD

Embodiments of the present disclosure relate to a system and method that detects and locates interference sources in a wireless communication network area using data collected by the network.

BRIEF SUMMARY

The present disclosure also describes a method and system for locating a source of interference. The source of interference may be external to the cellular network with which it interferes. Embodiments may use vertical characteristics to determine the location of an interferer.

An embodiment of a method for locating a source of interference external to a wireless telecommunications network includes assigning first and second elevation values to each pixel in a grid of pixels that represents an area associated with a plurality of cellular antennas, and calculating at least one probability value that the source of interference external to the wireless telecommunications network is located at an associated pixel by calculating respective probability values for pixels in the grid using the first elevation value and the second elevation value of the associated pixel and vertical gain values for each of the plurality of cellular antennas. The first elevation values may be elevation values of a ground level, and the second elevation values may be greater than the first elevation values for each pixel.

The method may further include calculating a first probability value using the first elevation value of the associated pixel, and calculating a second probability value using the second elevation value of the associated pixel. In an embodiment, the method includes providing a first probability value for the first elevation value of the associated pixel, and providing a second probability value for the second elevation value of the associated pixel.

Calculating the respective probability values may include calculating vertical angle of arrival values between the plurality of cellular antennas and the pixels in the grid by comparing elevations of the cellular antennas to the first and second elevation values for the pixels in the grid. In an embodiment, calculating the respective probability values includes determining a hypothetical interference value for the pixels in the grid using the first and second elevation values and the vertical gain, and comparing the hypothetical interference value to a measured signal strength value for each elevation value.

An embodiment of a method for locating a source of interference external to a wireless telecommunications network includes establishing a grid of pixels that represents an area associated with a plurality of cellular antennas, assigning an elevation value to each pixel in the grid, determining a vertical gain for each of the plurality of cellular antennas, and determining respective probability values for pixels in the grid using the elevation values and the vertical gain, each of the respective probability values representing a probability that the source of interference external to the wireless telecommunications network is located at an associated pixel.

In an embodiment, an apparatus comprises one or more processors, and memory storing instructions that, when executed by the one or more processors, cause the apparatus to establish a grid of pixels that represents an area associated with a plurality of cellular antennas, assign an elevation value to each pixel in the grid, determine a vertical gain for each of the plurality of cellular antennas, and determine respective probability values for pixels in the grid using the elevation values and the vertical gain, each of the respective probability values representing a probability that the source of interference external to the wireless telecommunications network is located at an associated pixel. An embodiment of a system may comprise this apparatus, and one or more of a base station and a server computer.

In an embodiment, a method for locating a source of interference external to a wireless telecommunications network includes receiving signal strength measurement data for measurements taken by a plurality of cellular antennas, establishing a grid of pixels that represents an area associated with the plurality of cellular antennas, and determining respective probability values for pixels in the grid using elevation data for the plurality of cellular antennas, wherein the probability values represent a probability that the source of interference is located at the respective pixels. The method may further include assigning an elevation value to each pixel in the grid, wherein the probability values are determined using antenna gain based on the elevation of the pixels and the elevation data for the cellular antennas.

The elevation values for the pixels may be based on topographical data for an area occupied by the pixels, and the antenna gain may be three-dimensional antenna gain that accounts for directivity in horizontal and vertical dimensions. In an embodiment, the antenna gain is determined for pairs of antennas and pixels using angles of arrival between the respective antenna-pixel pairs. In an embodiment, the angles of arrival include a vertical angle of arrival and a horizontal angle of arrival for each of the antenna-pixel pairs.

In an embodiment, determining the respective probability values for pixels in the grid includes using the elevation data to determine whether a line of sight is present between antenna-pixel pairs, and the probability values for the pixels are determined based on whether the line of sight is present. The elevation data may include elevation values for the pixels and elevation values for the cellular antennas. When a line of sight is not present between an antenna-pixel pair, the method may include determining whether to apply a diffraction factor to a probability value for the antenna-pixel pair. An embodiment may further include determining whether one or more environmental factor selected from foliage, buildings and atmospheric conditions is present, wherein the probability values for the pixels are determined based on whether the one or more environmental factor is present.

The method for locating the source of external interference may include determining that an external interference signal is present in the measurement data, and determining respective first signal strength values for the pixels in the grid, wherein determining the respective probability values for the pixels in the grid further comprises comparing the signal strength measurement data to the first signal strength values. The method may also include resolving the external interference.

Embodiments of the present disclosure extend to a system with one or more processors, and memory storing instructions that, when executed by the one or more processors, cause the apparatus to perform steps of the method described above. An example of the system is a spectrum analysis server, which may be coupled to one or more element of the cellular telecommunications network that is affected by the external interference.

The present disclosure also describes a method and system that generates and refines a probability map for identifying a source of interference. The probability map may be generated using three-dimensional antenna gain, and by accounting for line of sight conditions. In an embodiment, an interference search area is created using a Bayesian approach, and the search is refined using a contour map created using data from omni-directional cell sites. In another embodiment, the interference search area is improved using coverage areas for multi-sector sites.

In an embodiment of the present disclosure, a method for locating a source of interference affecting a wireless telecommunications network includes generating a first probability map that indicates probabilities of the source of interference being disposed in respective geographic locations, receiving interference data for at least one omnidirectional antenna that is disposed in a location covered by the map, generating a contour map of interference levels using the received interference data, and generating a second probability map by re-assigning probability values of the first probability map according to contours of the contour map. The first probability map may have an unbounded probability area originating from a directional antenna location, and re-assigning the probability values of the first map may include bounding the unbounded probability area.

In an embodiment, the first probability map includes a second unbounded probability area, and re-assigning the probability values includes reducing probability values of the second unbounded probability area to zero. The first probability map may have a plurality of pixels, where each pixel has an assigned probability value that represents a probability that the source of interference is located in a geographic area corresponding to the pixel. The method may include comparing characteristics of interference used to generate the first probability map to characteristics of the received interference data from the at least one omnidirectional antenna to determine whether the interference used to generate the first probability map has the same characteristics as interference associated with the received interference data.

In an embodiment, generating the contour map includes generating a plurality of bounded shapes, each shape having a perimeter line that represents a particular level of interference. The method may include assigning an attenuation value to each bounded shape, wherein generating the second probability map includes re-assigning probability values of the first map according to the attenuation values of the bounded shapes.

In an embodiment, generating the contour map includes performing Delaunay triangulation to connect locations for the omnidirectional antennas, and the contours include contour lines between sides of the Delaunay triangles. At least one of the locations for the omnidirectional antennas used to generate the contour map may be a virtual cell site at which no physical cell site exists, and the interference may be external interference that is not caused by the wireless telecommunications network. The method may further include resolving the external interference by performing physical activities, including making physical changes to the network configuration. In some embodiments, the method described above is performed by a spectrum analysis server comprising a processor and a non-transitory computer readable medium with instructions stored thereon which, when executed by the processor, perform the steps described above.

This disclosure further describes a system and method that use network management data to locate external interference. The network management data may include Configuration Management (CM) data, Performance Management (PM) data and topology data. Identifying the location of external interference source is accomplished by generating a probability heat map of possible locations of external interference around the affected area. Embodiments can determine location with a high degree of accuracy in a complex radio environment.

In an embodiment, a method for locating a source of interference external to a wireless telecommunications network includes receiving signal strength measurement data from a plurality of cellular antennas of multi-sector cell sites, determining that an external interference signal is present in the measurement data, establishing a grid of pixels that represents an area associated with the plurality of cellular antennas, determining respective first signal strength values for the pixels in the grid, and determining respective probability values for the pixels in the grid by comparing the signal strength measurement data to the first signal strength values.

In an embodiment, determining the first signal strength values includes determining an angle of arrival for a pair of antennas of a cell site for each of the pixels and determining an expected interference power for each of the pixels using the associated angles of arrival. Determining the respective probability values may include determining differences between the measured values for antennas in an antenna pair and a hypothetical interference value for each pixel, and assigning respective probability values to each pixel based on the differences.

In an embodiment, when a measured value of a first antenna of the antenna pair is equal to the noise floor and a measured value of a second antenna of the antenna pair is above the noise floor, the first signal strength value of the second antenna is set based on a difference between the measured value of the second antenna and the noise floor.

In an embodiment, assigning the probability values includes segmenting a normal distribution into a set of binned values and assigning one the binned values as the probability value for each pixel for a respective antenna pair. The probability values may be assigned by combining the binned values of antenna pairs of each cell site and combining probability values of each cell site, wherein the respective probability values for the pixels are the combined probability values of each cell site.

In an embodiment, the grid comprises a plurality of shapes that represent the pixels, and the grid is associated with a geographic area that includes all of the multi-sector cell sites.

Determining the respective probability values for pixels may include determining at least two local probability maxima within the grid, each of the local probability maxima being associated with a respective source of the external interference. An embodiment may include providing a heat map indicating probability values of at least a portion of the pixels in the grid.

Comparing the signal strength measurement data to the first signal strength values may include determining differences between the signal strength measurement data and the first signal strength values to determine the respective probability values.

Embodiments of the present application include a wireless telecommunications system comprising a spectrum analysis server configured to locate a source of interference external to a wireless telecommunications network, the spectrum analysis server comprising a processor and a non-transitory computer readable medium with instructions stored thereon which, when executed by the processor, perform one or more of the steps provided above.

BRIEF DESCRIPTION OF THE DRAWINGS

The following figures illustrate exemplary embodiments of the present disclosure. In particular:

FIG. 3 illustrates a process for determining a location of an external source of interference at a cell site.

FIG. 5 illustrates a Bayesian process for determining probabilities.

FIG. 24 illustrates a process for determining three-dimensional antenna gain.

FIG. 25 illustrates a process of applying mechanical tilt to antenna gain.

FIG. 26 illustrates calculating an angle of arrival between a pixel and a cellular antenna.

FIG. 27 illustrates calculating three-dimensional antenna gain for a cellular antenna.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
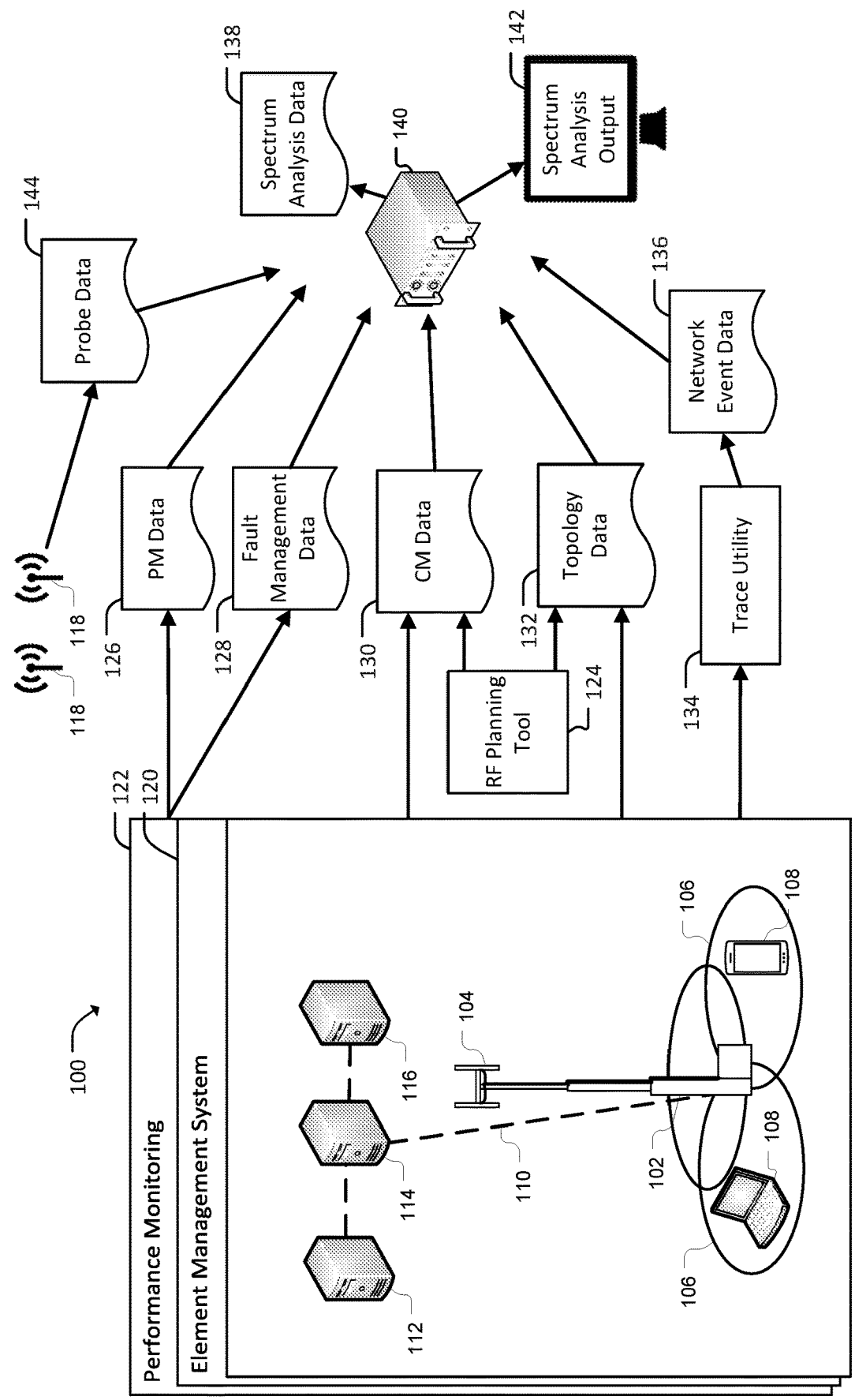
FIG. 1 illustrates a system for identifying interference in a cellular communications network according to an embodiment.

FIG. 1 illustrates a networked spectrum analysis system 100 according to an embodiment. The system 100 integrates information from available wireless network sources to detect, isolate, characterize and locate undesired radio frequency interference in the context of a wireless network. Sources of this information, which are hardware elements of a wireless network, are available in typical wireless cellular networks, but they are not conventionally connected and configured in the manner suggested by this disclosure. In particular, the spectrum analytics server 140 is a novel component of a telecommunications network.

A radio access portion of system 100 may include one or more base stations 102, each of which are equipped with one or more antennas 104. Each of the antennas 104 provides wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, NR, etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base station 102 may be outfitted with an omnidirectional antenna that provides service to a single cell for a given RAT.

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable or fixed wireless computing device that are provided with wireless communications services by a base station 102.

The system 100 may include a backhaul portion 110 that can facilitate distributed network communications between core elements 112, 114 and 116 and one or more base station 102 within a cellular network. In an embodiment, the backhaul portion of the network includes intermediate links between a backbone of the network which is generally wire line, and sub-networks or base stations 102 located at the periphery of the network. The network connection between any of the base stations 102 and the rest of the world may initiate with a link to the backhaul portion of a provider's communications network. A backhaul 110 may include an X2 connection through which base stations 102 communicate with one another directly.

The core network devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 112, 114 and 116 are different depending on the particular RAT or set of RATs that are present in the network. The core network devices support a radio access portion of the network that includes the base stations 102.

Elements of the communications network 100 are part of an Element Management System (EMS) 120 and a Performance Monitoring (PM) system 122. The PM system 122 may include base stations 102 as well as core network equipment that collect and process performance data and performance metrics for the network. A spectrum analysis server 140 interfaces with various network components, including components of the PM system 122 and the EMS 120.

Although FIG. 1 shows the spectrum analysis server as a single, discrete component, embodiments are not so limited. For example, in other embodiments, components of the spectrum analysis server 140 may be distributed among multiple computing entities. In addition, hardware for the spectrum analysis server may perform processes not directly related to interference. An apparatus according to an embodiment may include spectrum analysis server 140.

The performance monitoring system 122 generates performance data 126 for the wireless network. The PM data 126 may be derived from observations of network performance, which may be reported at a predetermined time interval, e.g., every minute, 5 minutes, 15 minutes, hourly or daily. PM data 126 may include raw event counts (e.g. counts of dropped calls or handover failures during the observation period) or complex derived performance indicators (e.g. noise rise normalized by user loading, Channel Quality Indicator (CQI) distribution statistics normalized by data volume, etc.). PM data 126 may include raw or aggregated performance data.

In some embodiments, PM data 126 includes data input from a dedicated PM tool, as well as data received directly from EMS 120, or elements of the Operations and Support System (OSS). In an embodiment, PM data 126 may be derived directly from network event data by the spectrum analytics server 140. For example, in an embodiment, when event data 136 is available to the spectrum analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to spectrum analysis server 140. Fault Management Data 128 includes, for example, alarm data that indicates performance issues at one or more cell site.

Configuration Management (CM) data 130 is input to the spectrum analysis server 140 from EMS 120. CM data 130 includes the current configuration of various wireless network equipment, such as the configuration of base stations 102 and core components such as Radio Network Controllers.

CM Data 130 is quasi-static and typically only changes as a result of deploying new network equipment, network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g. indoor, outdoor, distributed antenna system, etc.), etc. In addition to interference detection and characterization, topology data 132 may be used to aid in correlating PM data 126 and network event data 136 against actual physical locations, and for understanding physical distance and orientation relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and Topology data 132. Alternative embodiments may include a direct data connection between entities that perform RF planning functions and the spectrum analysis server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is typically timestamped with sub-second resolution, it can be used to determine variance of conditions over time at relatively short intervals, such as five minutes, one minute, 30 seconds, or as low as the reporting interval, which may be less than one second.

Network event data 136 may include call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, RSSI measurements, and protocol messages. Network event data 136 is not conventionally used for interference detection, characterization or identifying location.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used as part of the interference detection processes described by this disclosure.

The collection point for network event data 136 varies between specific wireless technologies and may vary in vendor-specific implementations. For instance, network event data 136 is typically collected at the RNC entity in 3GPP defined 3G networks (i.e., UMTS, HSPA), but network event data 136 is collected by the eNodeB entity in 4G LTE systems. Network event recordings may be pulled directly from the network elements that store the events by the spectrum analysis server 140, or automatically stored on a separate data storage server, or staging server, such that external systems such as the spectrum analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Trace concepts and requirements are explained, for example, in the Third Generation Partnership Project (3GPP) Technical Specification TS 32.421.

An embodiment may use network event data 136. In such an embodiment, spectrum analysis may derive base station performance indicators directly from network event data 136 in conjunction with, or in place of inputs from a Performance Monitoring system 122. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the spectrum analytics server 140. Subsequently, the measurements from dedicated energy detection probes 118 may be correlated with known probe positions and probe configuration characteristics (e.g. directional antennas) as well as current network loading data to enhance the detection of undesired radio frequency interference within the network.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, to enhance performance of spectrum analytics.

The spectrum analysis server 140 represents a specific processing device that interfaces with one or more of the external data sources described above. The spectrum analysis server 140 may perform one or more of anomaly and interference detection, analysis, comparison, characterization and localization processes described in this disclosure. In an embodiment, the spectrum analysis server 140 is physically located in an operator's Network Operations Center (NOC). From a logical perspective, the spectrum analysis server 140 is located in the Operations Support System (OSS) plane. The spectrum analysis server 140 may be an apparatus that performs one or more of the specific processing steps described below.

Figure 2:
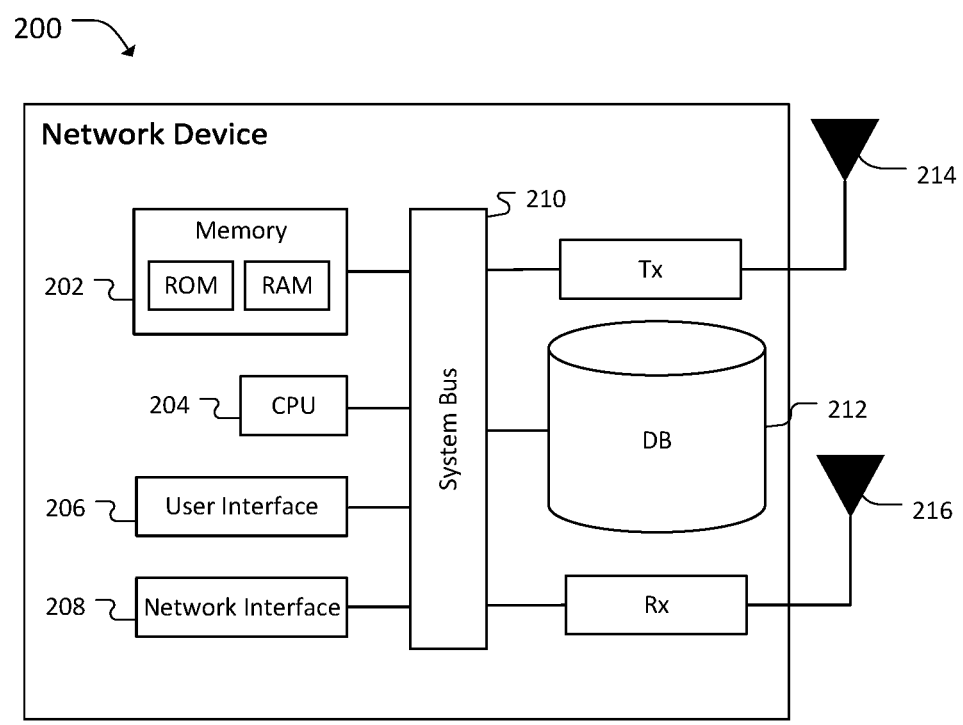
FIG. 2 illustrates a network device.

FIG. 2 illustrates a block diagram of a network device 200 that may represent UE 108, network controller devices 110, 112 and 114, a spectrum analysis server 140, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-transitory computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device 200 has wireless connectivity, it may have a transmitter 214 and a receiver 216, each of which may include one or more antennas that operate on one or more frequencies.

Wireless network nodes in telecommunication networks make periodic measurements of interference. The interference measurements can be used to adapt network parameters to optimize performance in the presence of interference. However, it is important to characterize the interference in order to implement appropriate optimization processes.

Causes of highly localized non-network interference include sparking transformers and industrial machinery. In addition to localized non-network interference, cells experience interference from transmissions within the network itself.

Processes used to handle localized non-network interference are different from processes used to handle interference from within the network. Non-network interference is typically handled by locating and eliminating the interference source. For example, interference from a sparking transformer can be mitigated by replacing the transformer. Network interference can be handled in a number of ways, including adjusting network parameters such as power, frequency, antenna azimuth and beamwidth, and changing how transmissions are scheduled. In order to implement the most effective processes for handling interference, it is important for networks to accurately detect and characterize the interference.

Anomalous behavior in a wireless network is generally identified by comparing measured values with values that are typical of the measurements and flagging values that have large deviations from the typical behavior. However, comparing sets of values with each other requires different techniques than techniques that are used for comparing single values. In addition, due to the inherent instantaneous variability of the wireless environment, it may be more effective to compare statistics of measurements over the observation period rather than the sequence of observations over the observation interval.

FIG. 3 illustrates an embodiment of a process 300 for determining a location of an external source of interference at a cell site. The process may initiate when external interference is detected at S302. Wireless operators are licensed to use specific frequencies in the RF spectrum, and interference caused by normally scheduled transmissions within the operator's wireless network is internal interference. In contrast, external interference is interference that is caused by equipment that is external to the operator's wireless network. There are many possible sources for external interference, including unlicensed or malfunctioning transmitters, industrial operations, sparking transformers, etc.

Techniques for detecting interference at cell sites, e.g. Signal to Interference plus Noise Ratio (SINR) measurements, are known in the art and can be applied at this step. Interference measurements that are collected and stored by the network as PM data do not typically separate network interference from external interference. Various techniques can be applied for differentiating network interference from external interference as known in the art, such as correlating interference measurements, and measuring interference during coordinated interference times as described in U.S. Pat. No. 9,572,055.

Normally, interference measurement data stored in network elements includes not only the external interference signal, but also traffic interference coming from mobile users connected to neighbor cell sites as well. Hence, processes may be performed to separate external interference magnitude from the combined measured interference data at each network element. For purposes of the present disclosure, the technique employed at S302 characterizes external interference sufficiently to determine that the interference is external to the wireless network and strength of the interference at a plurality of network nodes.

After external interference is determined to be present in a network area, a set of cells of interest 402 is selected at S304. In an embodiment, the cells of interest are cells that are affected by the interference, and more specifically cells at which external interference is detected. For example, when coordinated quiet times for specific frequencies are used to determine that external interference is present, the set of cells may include every cell that detects a signal above the noise floor in the specific frequencies at the quiet times.

Figure 4:
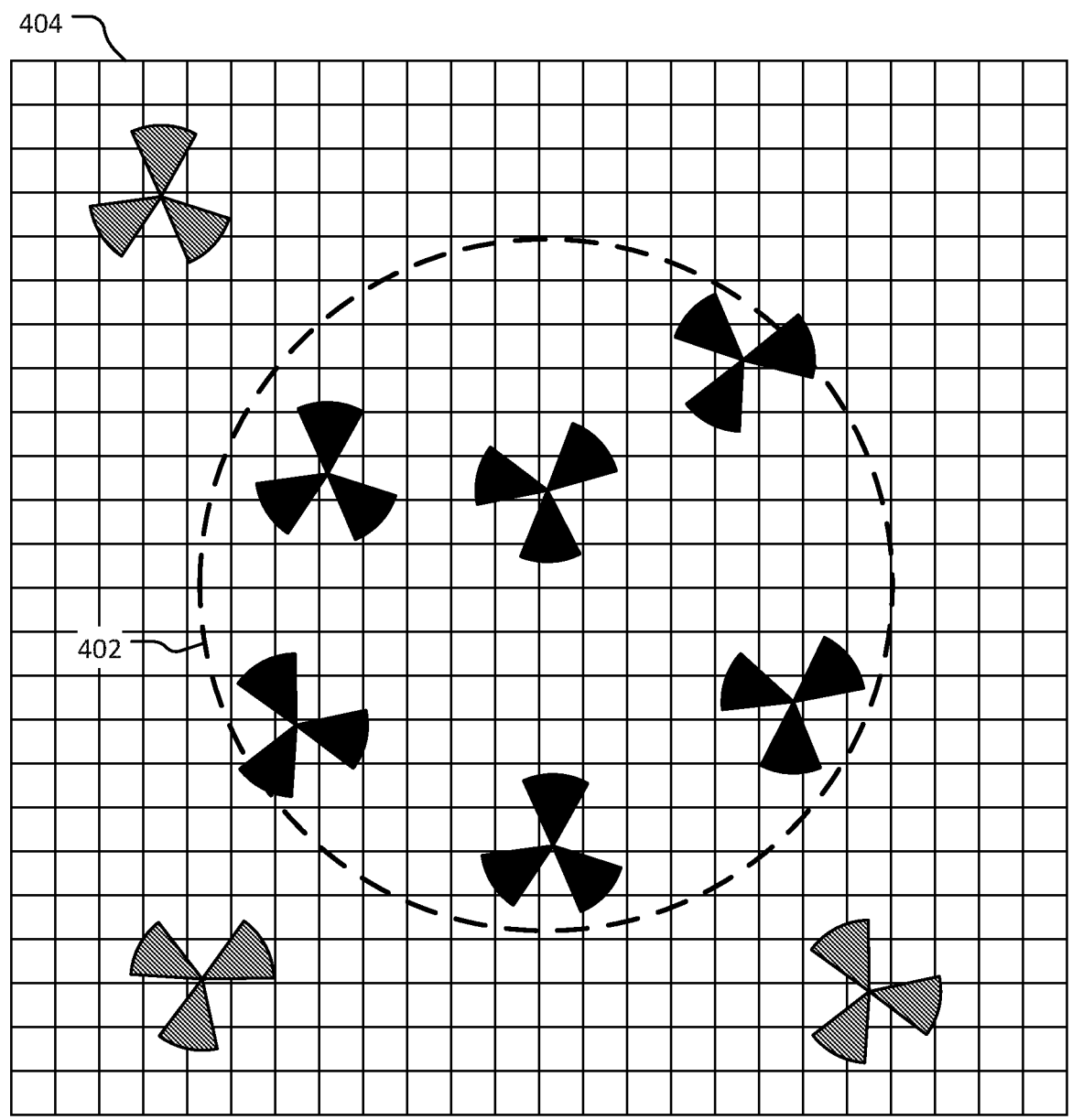
FIG. 4 illustrates an embodiment of a grid pattern around cells of interest.

After cells of interest are determined at S304, a grid pattern 404 is established around the cells of interest at S306. The grid pattern establishes a pattern of points around the cells of interest. FIG. 4 illustrates an embodiment of a grid pattern 404 that is established around the set 402 of cells of interest.

The size and density of the grid points may vary between embodiments. The grid is to establishes a set of sectors, or pixels, for which a probability that an interference source being present is calculated. Because interference is evaluated for each pixel in a grid, a lower grid density minimizes the number of calculations performed, while a higher grid density increases the resolution of a result.

The grid should be large enough to encompass the actual location of an interference source. It is unlikely that an interference source is located near unaffected cells, so the extent of a grid may be determined based on an area that encompasses all of the cells of interest 402. In some embodiments, grid coordinates, e.g. geographic locations corresponding to a grid, can be set and adjusted by a user. For example, if a user selects a first grid size that does not have any pixels with high probability values, the user could create a larger grid. Other embodiments may automatically generate a grid, e.g. by establishing a geographic area that larger than affected cells by a predetermined value. Although FIG. 4 shows grid 404 using cartesian coordinate lines, other shapes are possible.

A probability for the of a source of interference being located at each pixel in a grid is determined at S308. FIG. 5 illustrates a Bayesian process 500 for determining probabilities for the source of interference being located at each pixel.

Power values for receivers that detect interference are determined at S502. Power values may be determined for every antenna that has detected a level of interference above the noise floor. The interference magnitudes from all cells of interest may be expressed as:

$$P_R = \{[P_1^1, P_2^1, \ldots, P_{L_1}^1], [P_1^2, P_2^2, \ldots, P_{L_2}^2], \ldots, [P_1^N, P_2^N, \ldots, P_{L_N}^N]\},$$

where $P_j^i$ is the measured interference magnitude at i-th site and j-th sector cell, $L_i$ is the number of sector cells at the i-th site and N is the total number of affected cell sites. In an embodiment, only cell sites that have two or more sector cells are analyzed.

For each cell site, interference magnitude differences may be calculated and stored as follows:

$$\Delta P_R = \{[\Delta P_1^1, \Delta P_2^1, \ldots, \Delta P_{L_1}^1], [\Delta P_1^2,$$
$$\Delta P_2^2, \ldots, \Delta P_{L_2}^2], \ldots, [\Delta P_1^N, \Delta P_2^N, \ldots, \Delta P_{L_N}^N]\} =$$
$$\{[P_1^1 - P_2^1, P_2^1 - P_3^1, \ldots, P_{L_1}^1 - P_1^1], \ldots, [P_1^N - P_2^N, P_2^N - P_3^N, \ldots, P_{L_N}^N - P_1^N]\}$$

Hypothetical interference magnitude values are determined at S504. In an embodiment, hypothetical interference magnitude values are determined for every cell of interest and every pixel in a grid 404. A hypothetical interference magnitude may reflect expected interference measurements at a cell site if an interference source exists at a given pixel.

When a site receives interference from an external source, the measured interference power depends on several link gain components, such as pathloss, transmit power, and antenna gain. For example, receiver interference power can be expressed as follows:

$$P_R = P_T + G_T + G_R - L_T - L_R - PL,$$

where, $P_T$ is an external interferer's transmit power in dB,
$G_T$ is transmit antenna gain at the interferer in dB,
$G_R$ is receiver antenna gain at the cells in dB,
$L_T$ is signal loss at the transmitter, e.g., cable loss, in dB,
$L_R$ is signal loss at the receiver, e.g., cable loss, in dB, and
PL is pathloss from the radio channel, including shadowing, in dB.

Typically, no information is available for characteristics $P_T$, $G_T$, and $L_T$ of a source of external interference. On the other hand, receiver information $G_R$, $L_R$ is available to an operator, and pathloss values can be estimated with a relatively high degree of accuracy, especially in consideration of known base station and geographic characteristics.

For a given site, receiver signal power at two different cells can be expressed as:

$$P_{R1} = P_T + G_T + G_{R1} - L_T - L_{R1} - PL_1,$$

$$P_{R2} = P_T + G_T + G_{R2} - L_T - L_{R2} - PL_2.$$

Considering the difference, $P_{R1} - P_{R2}$, transmitter details are canceled out as follows:

$$\Delta P_R = P_{R1} - P_{R2} = (G_{R1} - G_{R2}) - (L_{R1} - L_{R2}) - (PL_1 - PL_2)$$

In general, cable losses at different base stations can be assumed to be the same without substantially compromising location accuracy. Hence, the $\Delta P_R$ can be expressed as:

$$\Delta P_R = (G_{R1} - G_{R2}) - (PL_1 - PL_2)$$

When the two cells are in the same site, the last term, $(PL_1 - PL_2)$, is also canceled out because pathloss and shadowing values are considered to be the same for cells of the same cell site.

$$\Delta P_R = (G_{R1} - G_{R2})$$

Accordingly, receiver power deltas may be calculated for specific pairs of cells. More specifically, receiver power deltas may be determined for each pair of cellular antennas for a given cell site. When a cell site is a three-sector site and external interference is detected at every sector of the cell site, hypothetical receiver power values are calculated for all three combinations of antenna pairs. However, in an embodiment in which a cell site provides service to more than three cells, receiver gains need not be calculated for non-adjacent antenna pairs. In one embodiment, only adjacent pairs of antennas are evaluated for a cell site.

Figure 6A:
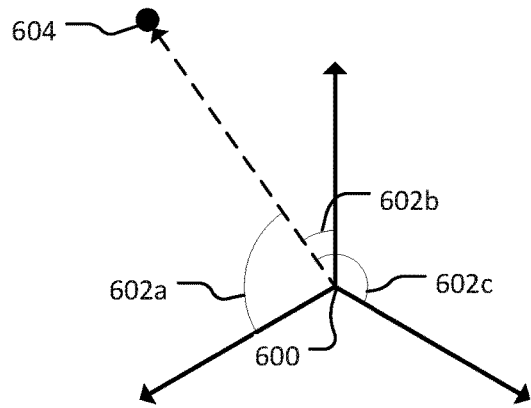
FIG. 6A illustrates angles of arrival for antennas of a three-sector cell site.

FIG. 6A illustrates a three-sector cell site 600, and angles 602a, 602b and 602c, which are respective angles between pointing directions of antennas of the cell site and the location of a pixel 604. The receiver antenna gain, $G_R$, can be obtained by calculating the Angle of Arrival (AoA) 602 from the pixel to the receiver azimuth direction. In an embodiment, the AoA may be established to a center of each pixel.

After AoA values are obtained for each antenna, receiver antenna gain for each antenna can be obtained using an antenna pattern. The antenna pattern may be a generic pattern such as the pattern expressed by the following formula:

$$G_R = -\min\left(12 \times \left(\frac{AoA}{HPBW}\right)^2, Am\right)$$

in which HPBW is half-power beam-width and Am is a minimum antenna gain level, for example, −25 dB. Alternatively, the antenna pattern may be provided as a lookup table of gain values. For example, a lookup table may be created with a resolution of one value per degree for a total of 360 values. In such an embodiment, the antenna gain for a given angle of arrival can be obtained using the lookup table. In addition, an embodiment may apply interpolation for angles falling between the values listed in the table.

Once antenna gains at each cell from every pixel in a grid (k, k=1, . . . , M) are obtained, hypothetical data of relative interference magnitudes is determined ($\Delta H_R(k)$), with an assumption that an external interference source exists at a k-th pixel in the grid area, using the known information for the data created from measurement data, $\Delta P_R$ as shown in the following equation:

$$\Delta H_R(k) = \{[\Delta H_1^{1}(k), \Delta H_2^{1}(k), \ldots, \Delta H_{L_1}^{1}(k)], \ldots, [\Delta H_1^{N}(k), \Delta H_2^{N}(k), \ldots, \Delta H_{L_N}^{N}(k)]\}$$

in which, for example, $\Delta H_j^{i}(k) = G_{Ri,1}(k) - G_{Ri,2}(k)$, is the hypothetical receiver power difference between sector 1 and sector 2 at the i-th site and $L_i$ is the number of cells at the i-th site, i=1, 2, . . . , N. Thus, hypothetical values are established at S504 for pairs of antennas for each cell site.

When one or more measured interference level is equal to the noise floor level and the sector index that gives highest hypothetical receiver antenna gain matches with the highest measured interference magnitude sector, the hypothetical interference differences between the highest interfered sector and those sectors with noise floor level of interference may be adjusted to have the same magnitude differences as measured magnitude. In this way, a localization algorithm can identify a range of angles where interference is arriving even when some of measurement data are submerged by the noise floor. An example of this is shown in FIG. 6B.

Figure 6B:
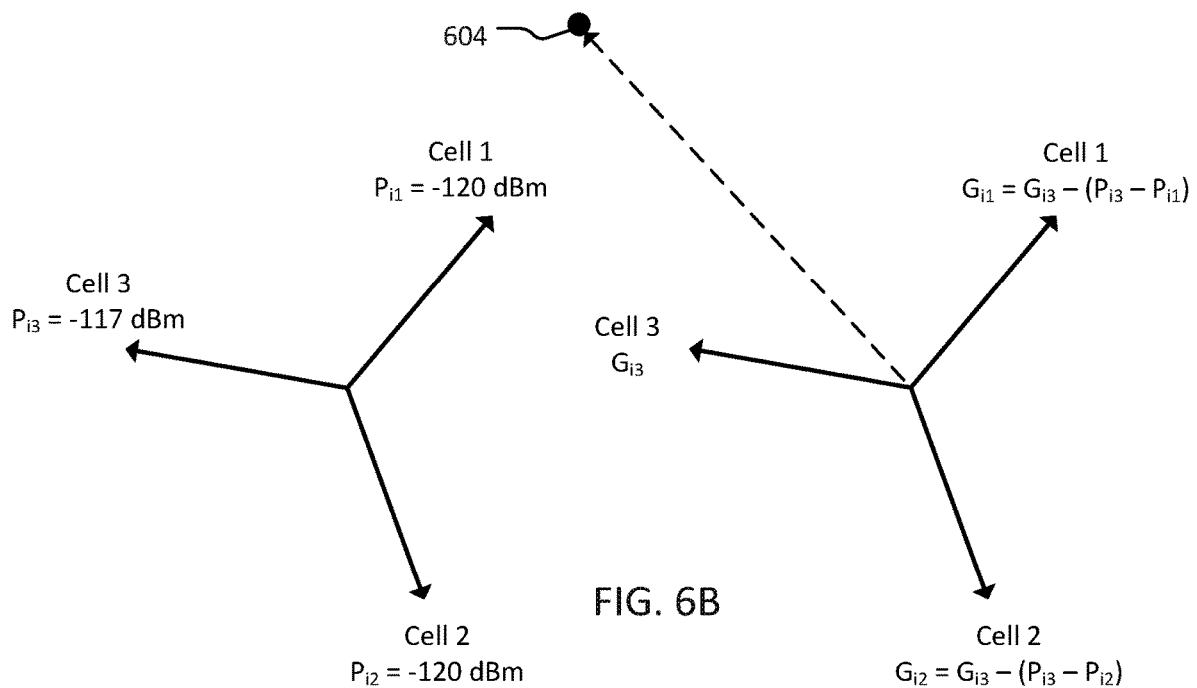
FIG. 6B illustrates antenna gain for the three-sector cell site.

FIG. 6B illustrates an embodiment of determining hypothetical antenna gain values when noise-floor saturation is present. In that embodiment, a hypothetical antenna gain value of 0 dB is determined for Cell 3 based on pixel location 604, and lower values, e.g. −10 dB and −20 dB are determined for cells 1 and 2. However, actual measured data from cells 1 and 2 is limited by the noise floor of −120 dBm. In such a situation—where measured power is limited by the noise floor—hypothetical antenna gain values of the cell site 600 are adjusted based on the measured data. Resulting hypothetical gain values for the cell site in FIG. 6 would therefore be 0 dB for Cell 3, and −3 dB for Cell 1 and Cell 2. Accordingly, an embodiment may adjust hypothetical antenna gain values when those values fall below the noise floor, so that cell sites with measurements below the noise floor can be used to improve the results of localization.

When conventional techniques are applied, and an antenna's measurements are limited by the noise floor, that antenna is effectively a nullity that cannot be used to determine location. Thus, when two antennas of a three-sector cell site do not detect a signal above the noise floor, the cell site cannot contribute to localization using conventional techniques that employ angular data based on multiple antennas of a cell site. In contrast, as described above, embodiments of the present disclosure can use measurements from every antenna that registers a signal to locate interference, even when one or more of the measurements from co-sited antenna are limited by the noise floor.

Embodiments of the present disclosure apply a Bayesian approach to probability by determining probabilities for a plurality of hypotheses, where each pixel location represents a hypothesis that an interference source is located at that pixel location. After having measured data $\Delta P_R$, and hypothetically created data for each pixel k, $\Delta H_R(k)$, where k= 1, . . . , M, M being the total number of pixels in the grid area. With a set of measurement data, P (=$\Delta P_R$) and hypothetical data, H(k)(=$\Delta H_R(k)$), the probability of external interference being existing at the k-th pixel can be expressed as:

prob(k)=prob(H(k)|P)∝prob(P|H(k))·prob(H(k))∝prob(P|H(k)).

The expression above uses proportionality instead of equality and also omits the denominator prob(P) and prob(H(k)) because they are constants.

The probability of interference existing at each pixel may be determined using measurement data and hypothetical data. The hypothetical interference values can be compared to measured values at S508 to determine the likelihood that an interference source is present at a given pixel, where closer matches between hypothetical data and measured data suggest higher probabilities that an interferer is present at an associated pixel. Since the equations described above remove unknown factors such as interference transmit power and pathloss amount, the pixel whose H(k) matches with P will give probability of '1' in theory. However, there are still a number of factors that lead to differences between the measurement and hypothetical data, such as errors in measurement, differences in antenna models, etc.

Hence, inferring the location of interference may be achieved by reallocating the probability at each pixel (k) per site (i) as follows.

$$prob(P \mid H(k)) = \prod_{i=1}^{N} prob(\Delta \overline{P}^{i}, \Delta \overline{H}^{i}(k))$$

where N is the total number of affected sites with two or more sector cells, $\Delta \overline{P}^{i} = [P_1^{1} - P_2^{i}, \ldots P_{L_i}^{i} - P_1^{i}]$, and $\Delta \overline{H}^{i}(k) = [\Delta H_1^{i}(k), \Delta H_2^{i}(k), \ldots, \Delta H_{L_i}^{i}(k)]$ for an i-th site, where $L_i$ is the number of sector cells at the i-th site.

A probability, prob($\Delta \overline{P}^{i}$, $\Delta \overline{H}^{i}(k)$), can be obtained for each pixel using a hypothesis that differences between $\Delta \overline{P}^{i}$ and $\Delta \overline{H}^{i}(k)$ at the i-th site are caused by the randomness of radio environment and measurement devices even though interference actually exists at the pixel, k. As for the randomness of radio environment and measurement devices, embodiments assume a normal distribution with a standard deviation of σ.

The probability created from each site, prob($\Delta \overline{P}^{i}$, $\Delta \overline{H}^{i}(k)$) can be expressed as:

$$prob(\Delta \overline{P}^{i}, \Delta \overline{H}^{i}(k)) = \prod_{l=1}^{L_1} \int \int_{x=\Delta P_l^{i} - \Delta H_l^{i}(k)} \frac{1}{\sigma \sqrt{2\pi}} \exp\left[-\frac{x}{2\sigma^2}\right] dx$$

in which $L_i$ is the number of sector cells at the site i, and $L_i \geq 2$. Since the distribution function is continuous, the probability of x exactly matching with $\Delta P_l^{i} - \Delta H_l^{i}(k)$ will be zero.

In an embodiment, probability values may be applied from a limited set of values, or bins, based on a number of standard deviations between measured and hypothetical values at S508. As explained above, the standard deviation here theoretically represents randomness in a number of variables. However, the specific value of the standard deviation is not the result of a calculation—rather, a value can be assigned to the standard deviation by a user. Persons of skill in the art will recognize that it is possible to assign various values to the standard deviation to affect the results of process 500.

Figure 7:
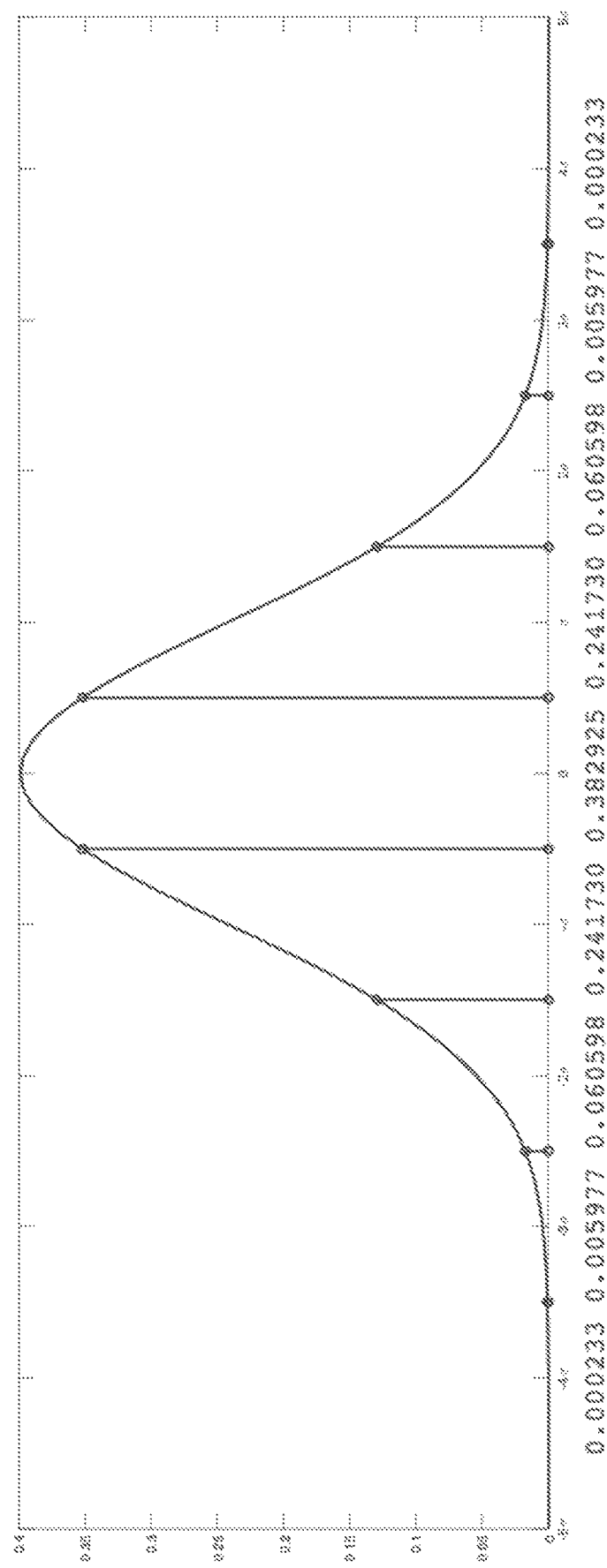
FIG. 7 illustrates a segmented normal distribution.

A probability distribution function can be used to establish a probability for $\Delta P_l^i - \Delta H_l^i(k)$ falling within a particular range of values, as opposed to taking on any one specific value. FIG. 7 illustrates a normal curve that is divided into 9 separate bins. Embodiments are not limited by this specific example—in other embodiments, different divisions are possible. In an embodiment according to FIG. 7, when the value of $\Delta P_l^i - \Delta H_l^i(k)$ falls within a centered standard deviation $[-\sigma/2, \sigma/2]$, the probability will be 38.2925%. Therefore, when the hypothetical interference value for a pixel is plus or minus one half standard deviation from the measured value, a probability value of 0.382925 is assigned to that pixel. Accordingly, higher probability values are assigned to pixels when the difference between measured values and hypothetical values is lower, and vice versa.

After probability values have been determined at each pixel for each pair of antennas with measurements above the noise floor, the probability values for antenna pairs at each cell site are combined at S510. In an embodiment, the probability values are combined multiplicatively so that pixel values for each cell site are the product of all valid antenna pair probabilities for the cell site. In some embodiments, the probability values may be scaled to adjust the difference between the highest and lowest probability values.

Figure 8C:
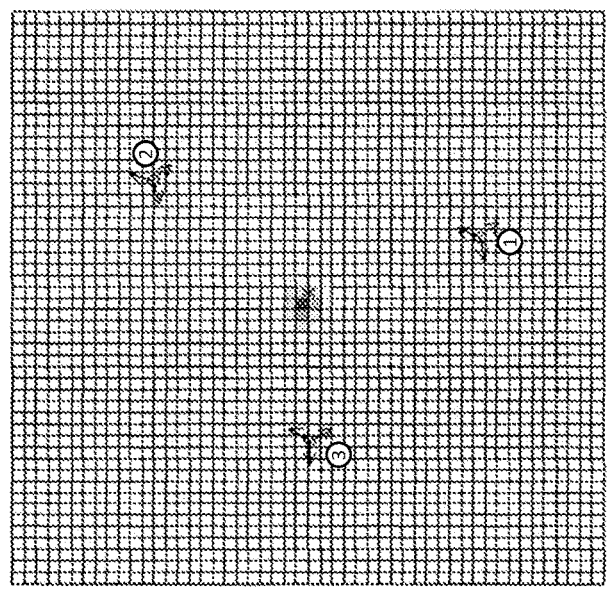
FIG. 8C illustrates pixel probabilities for three cell sites.
Figure 8B:
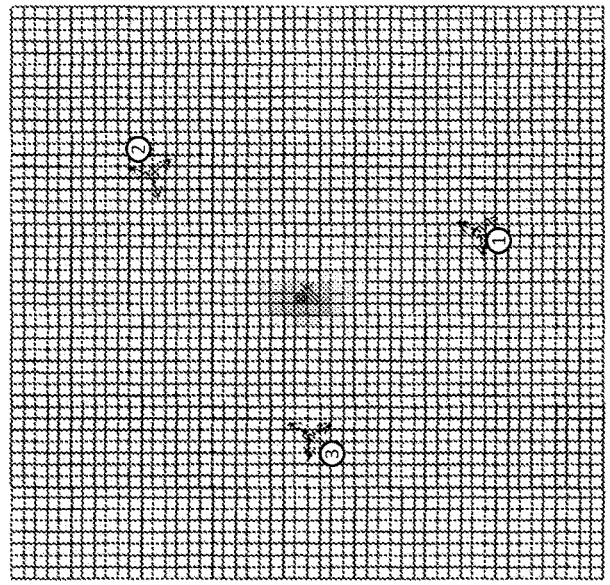
FIG. 8B illustrates pixel probabilities for two cell sites.
Figure 8A:
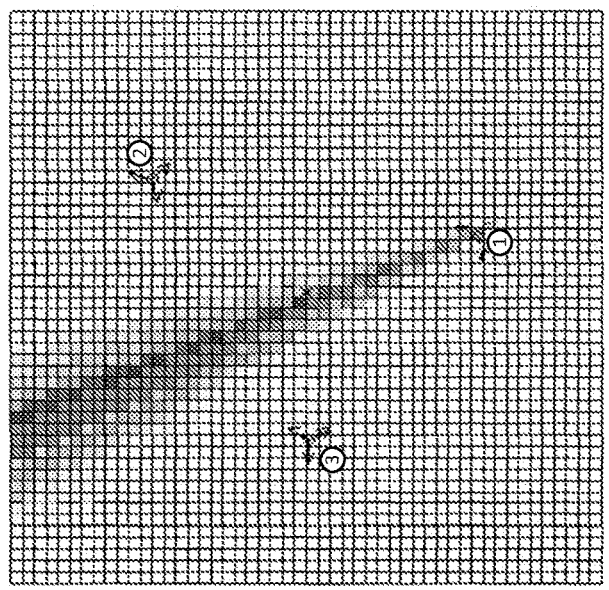
FIG. 8A illustrates pixel probabilities for a single cell site.

Probability values for all cell sites are combined at S512. FIGS. 8A-8C illustrate an example of re-assigning probability values for each pixel after calculating joint probability site by site. In FIGS. 8A-8C, dark colored squares represent probability of external interference being at the associated location, or pixel. The probability values are scaled to the shade of the squares, so that squares representing pixels with a higher probability have a darker shade than squares that represent lower probabilities. FIG. 8A illustrates probability values for all the pixels in the grid are obtained from data at cell site 1 resulting from combining antenna pair probability values at S510.

FIG. 8B illustrates probability values that have been re-assigned after calculating joint probabilities with data for site 2. In other words, FIG. 8B represents a combination of probabilities for site 1 and site 2. Finally, FIG. 8C shows the final probability values for each pixel in the grid using combined probability data from cell sites 1, 2 and 3.

Figure 10:
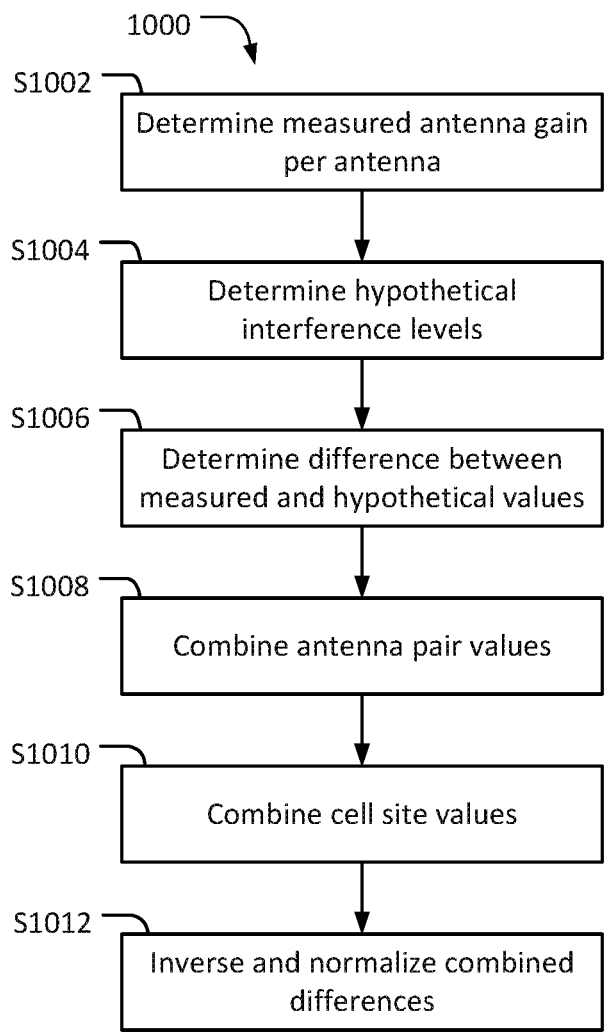
FIG. 10 illustrates a process for determining probabilities using Euclidian distance.

In another embodiment, determining the probability of an interferer at each pixel at S308 may be performed by determining a Euclidian distance between measured and hypothetical values. FIG. 10 illustrates an embodiment of a process 1000 of determining probability values for pixels in a grid using Euclidian distance.

In process 1000, determining measured antenna gain for each antennal at S1002 and determining hypothetical interference values at S1004 may be performed using the same measurement data $\Delta P_R$ and hypothetically created data for each pixel k, $\Delta H_R(k)$ from S502 and S504. Probabilities of an interference source being located at each pixel in a grid can be found based on Euclidean distances between measurement data and hypothetical data at S1006. For example, Euclidian distance for each pixel can be calculated as:

$$E\_dist\_k = \sum_{i=1}^{N} \sum_{l=1}^{L_i} (\Delta P_l^i - \Delta H_l^i(k))^2$$

In this equation, the hypothetical interference magnitude vectors are compared directly to measured interference vectors, and the differences between the vectors are characterized as the Euclidian distance between the vectors. In addition, determining differences between signal strength measurement data and the hypothetical values to determine the respective probability values at S1006 may include raising the differences to some power. In the example shown in the above equation, the power is two, but other powers are possible. After calculating distance values E_dist_k for each pixel for each antenna pair, the distance values for all pixels for each pair of antennas may be combined at S1008, and the distance values for each cell site are combined at S1010. Combining the distance values may include, for example, determining respective products of distance values for each pixel.

Because smaller Euclidian distance values represent a higher probability of a source of interference being located at a given pixel, the values resulting from S1010 are inversely proportional to the actual probability values. In other words, a smaller combined distance value for a pixel represents a higher probability of an interference source being located at that pixel. Accordingly, an additional step of inversing and normalizing the distance values may be performed at S1012 so that the scale of distances more closely matches the scale of probabilities represented by the distances.

The resulting probability values from process 1000 may be used to generate a probability heat map at S310. In an embodiment, the heat map is generated using values which are inversed and normalized at S1012. In other words, a process for creating a graphical representation of probabilities for each pixel on a grid involves making the pixel that yields smallest difference values between actual measurements and hypothetical data as the highest probable location of external interference. In an embodiment, inversing the differences to determine probability values is generally represented by the following equation:

$$prob(k) = \frac{1}{E\_dist\_k} / \max\left(\frac{1}{E\_dist\_k}\right)$$

Other embodiments of determining probabilities using Euclidian distance are possible. Even though the distance values from S1006 are inverse to a conventional probability scale, it is possible to create a heat map that is useful to a wireless operator by applying an inverse graphical scale, and/or using a non-linear graphical scale. Additional operations, e.g. logarithmic scaling, may be performed on the combined site values to provide a useful graphical or numeric output, such as the heat maps shown in FIG. 11 and FIG. 12.

In the process 500 described above, each pixel is assigned a single probability value. However, depending on how the grid is established at S306, each pixel may represent a significant geographical area. Therefore, in an embodiment, a process 500 of determining probability can be implemented that accounts for a range of probability levels that could be encompassed by the area represented by a single pixel.

Figure 9B:
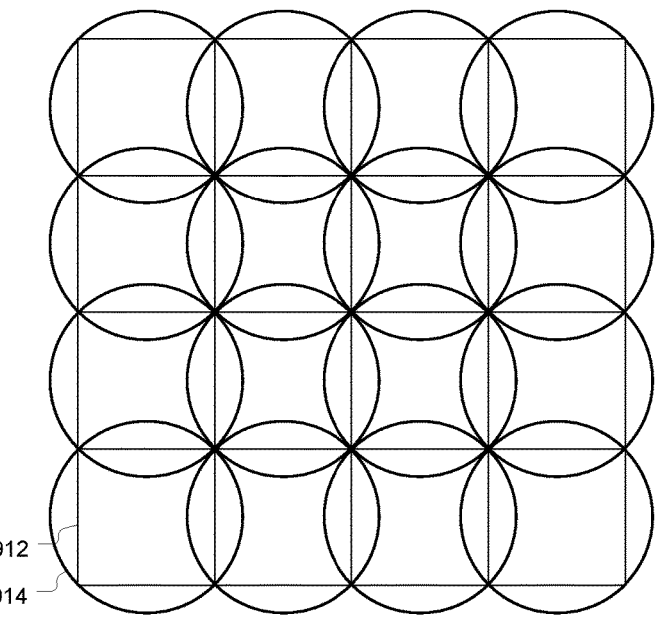
FIG. 9B illustrates pixel shapes circumscribed by circles.
Figure 9A:
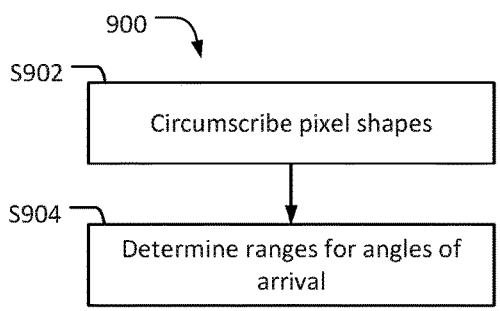
FIG. 9A illustrates a process for determining a range of an angle of arrival for a pixel.

FIG. 9A shows a process 900 of determining a range of an angle of arrival for a pixel that may be performed as part of step S504 of determining hypothetical interference values. As seen in FIG. 9B, pixel shapes 912 are circumscribed with circles 914 at S902. Although the shapes shown in FIG. 9B are squares, other shapes are possible, such as hexagons or triangles.

When the Angle of Arrival to a cell is $\phi$, the range of a hypothetical AoA for a pixel can be expressed as $$[\phi - \theta, \phi + \theta], \text{ where } \theta = \frac{\pi}{2} - \cos^{-1}\left(\frac{R}{d}\right).$$

Figure 9C:
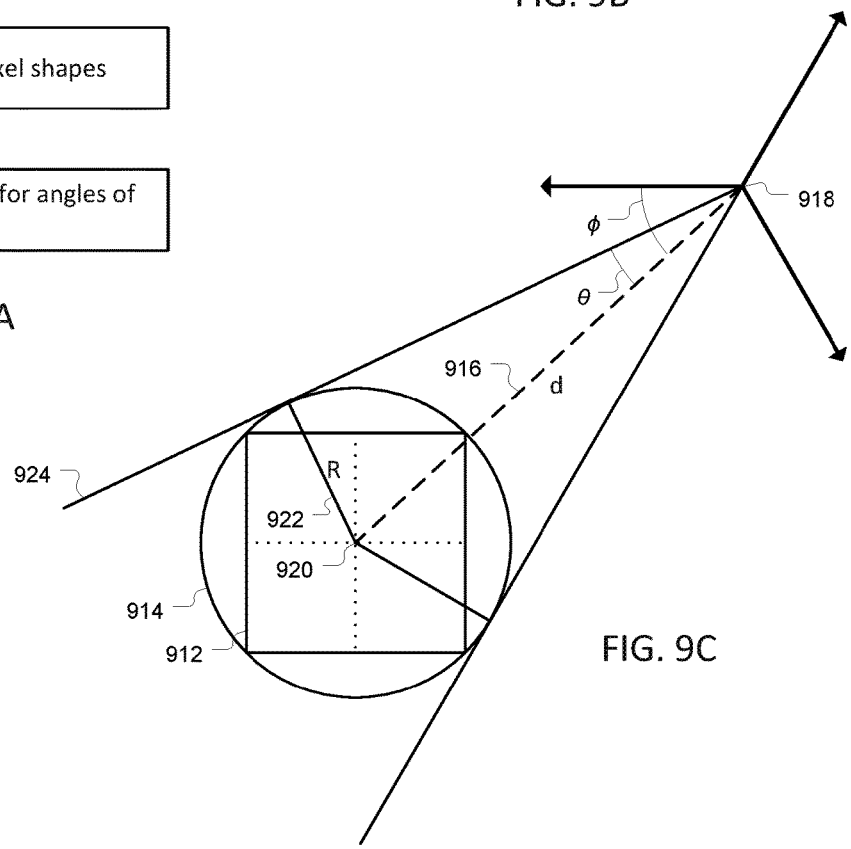
FIG. 9C illustrates a cell site in relation to a circumscribed pixel.

As seen in FIG. 9C, $\theta$ is the angle between line 916 that runs between a location of cell site 918 and the center point 920 of a pixel, and line 922 that is tangential to circle 914 and runs through the location of cell site 918. Here, $\Delta H_I^i(k)$ may be obtained with these hypothetical AoA ranges, and maximum and minimum values of $(\Delta P_I^i - \Delta H_I^i(k))$ may be used as a range to determine a probability from the probability distribution function.

Ranges of $\Delta P_I^i - \Delta H_I^i(k)$ values, e.g. determining $(\Delta P_I^i - \Delta H_I^i(k))_{min}$ and $(\Delta P_I^i - \Delta H_I^i(k))_{max}$ for each pixel may be determined at S904. In an embodiment that accounts for range, ranges may be applied to assign probability values at S508 by applying the calculated range directly to the following equation:

$$prob(\Delta \overline{P}^i, \Delta \overline{H}^i(k)) = \prod_{i=1}^{L_i} \int \int_{(\Delta P_I^i - \Delta H_I^i(k))_{min}}^{(\Delta P_I^i - \Delta H_I^i(k))_{max}} \frac{1}{\sigma\sqrt{2\pi}} \exp\left[-\frac{x}{2\sigma^2}\right] dx$$

Pixels are represented as squares 902, and circles 904 are circumscribed around each square pixel. The circumscribed circle 914 presents a uniform size (diameter) from every possible location on the grid of pixels, so that angular calculations are not affected by the uneven profile of a square.

AoA ranges for pixels diminish in proportion to distance from a cell site. Therefore, an effect of accounting for pixel range is that closer pixels have a larger AoA ranges, resulting in higher probability values than pixels that are farther from a cell site. Diminishing probability according to distance may reflect variability in a radio environment, where larger distances have a higher probability of being occupied by objects or terrain that affects the radio environment.

Figure 11:
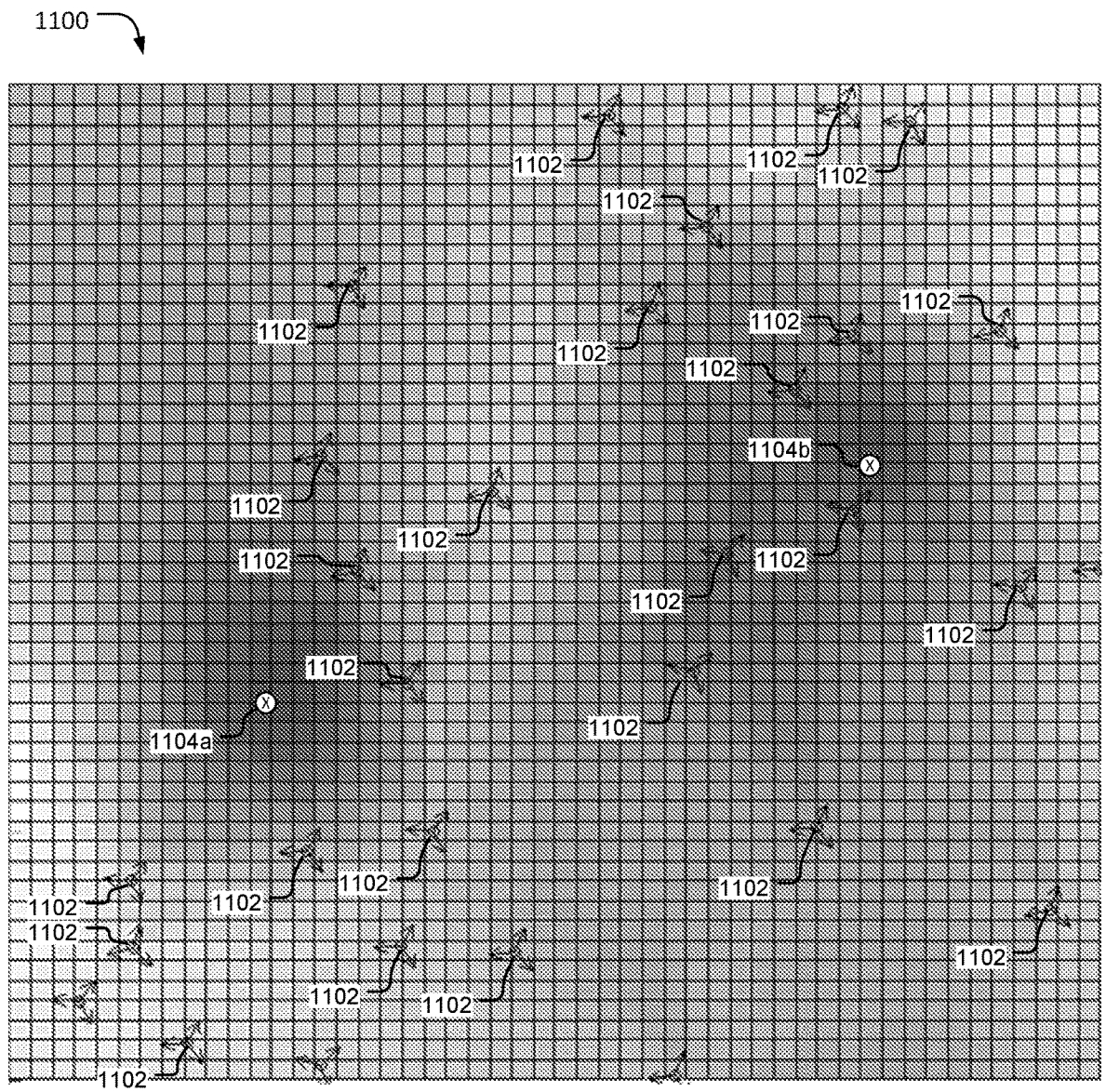
FIG. 11 illustrates a heat map showing a distribution of probability values in a grid of pixels.

In an embodiment, a probability heat map is generated at S310. FIG. 11 shows an embodiment of a heat map 1100 that is generated by an embodiment of the present disclosure. In the heat map 1100 in FIG. 11, the pixels of the grid are shaded according to a probability of a source of external interference 1004 being present at each pixel location. The shading of the heat map is scaled so that darker areas represent a higher probability of the interference source being present, and lighter areas indicate lower probability values.

Two external interference sources are present in FIG. 11, labeled as 1004a and 1004b. The locations of the interference sources 1004 are marked with an "X." FIG. 11 illustrates two distinct interference sources as indicated by the two distinct associated dark colored pixel clusters. Heat map 1100 in FIG. 11 was generated using simulated measurement data for a plurality of cell sites 1102.

Figure 12:
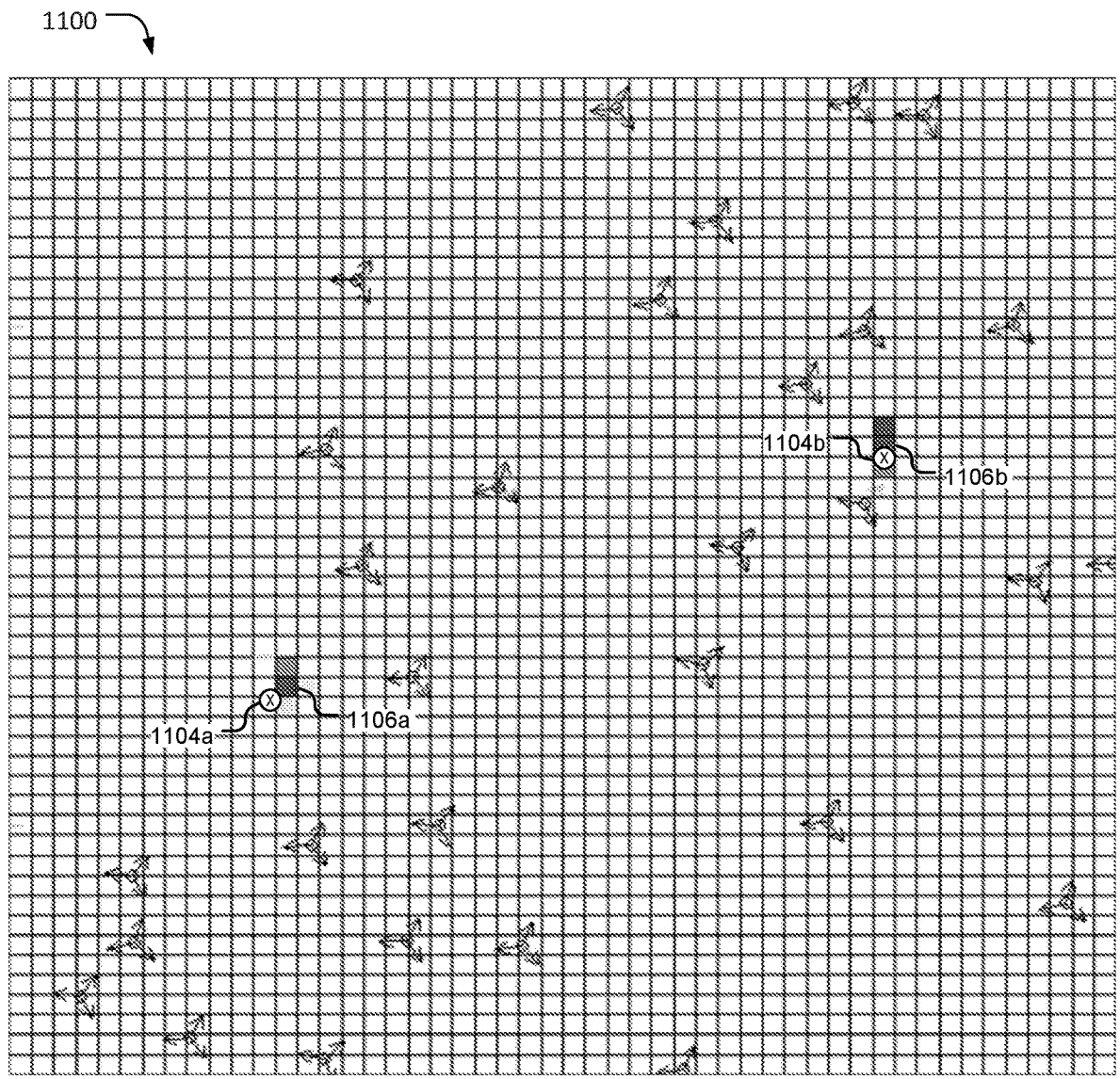
FIG. 12 illustrates a heat map created using the same data as FIG. 11 that is scaled to show local maxima and a relatively minor variance of probability values for surrounding pixels.

In FIG. 11, probability values were scaled according to a logarithmic scale to show a relatively broad probability distribution. In contrast, FIG. 12 shows a heat map 1100 that is scaled to show local maxima 1106 and a relatively minor variance of probability values for surrounding pixels. FIG. 12 was created using the same data as FIG. 11, except that probability values used to shade pixels are not log values. Pixels 1106a and 1106b with the highest probability values are very near to interference locations 1104a and 1104b, respectively, and maximum pixel value 1106b is geographically coincident with interference source 1106b. Accordingly, the locations in FIG. 12 are highly accurate.

Figure 13:
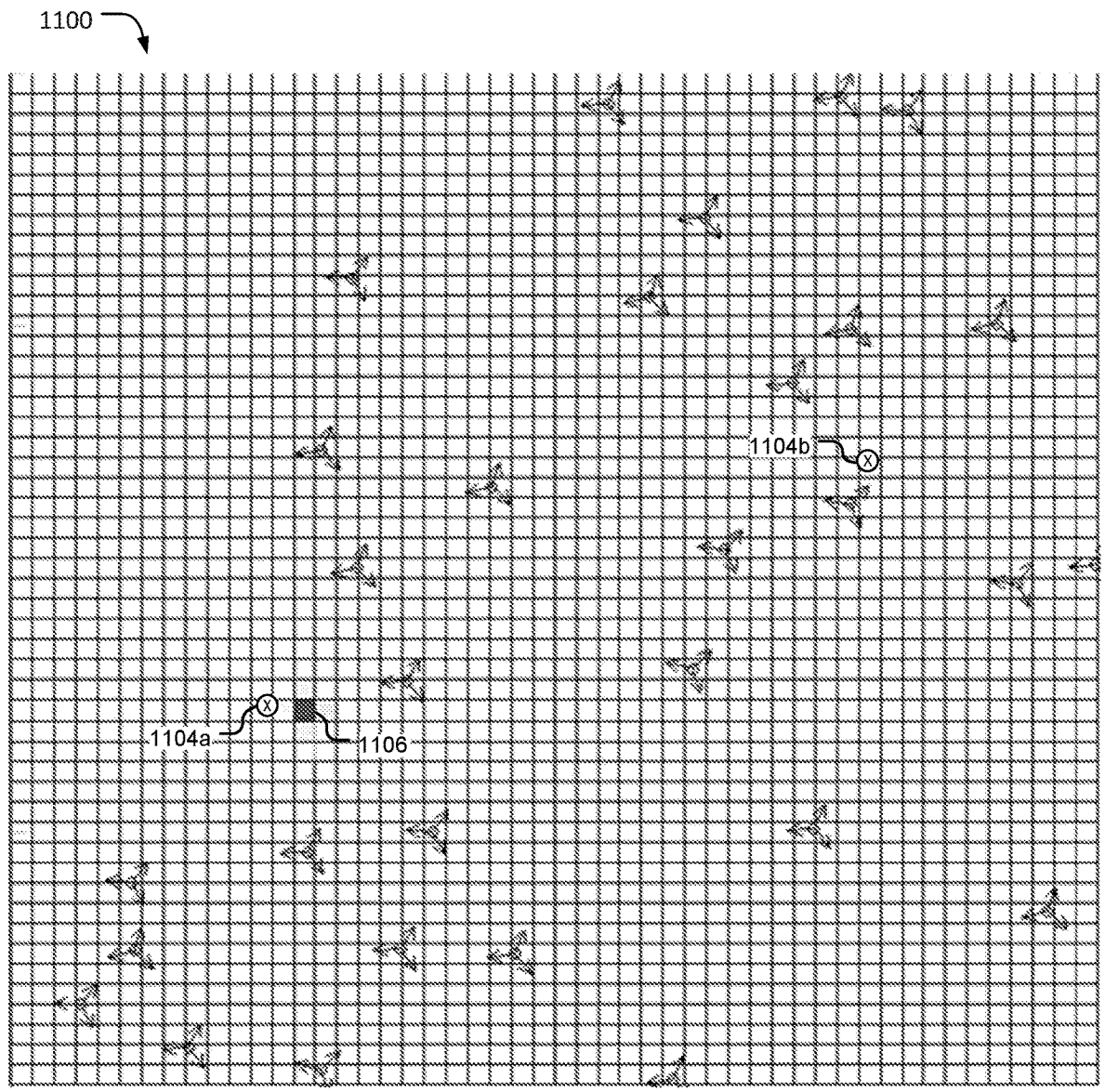
FIG. 13 illustrates a heat map resulting from a trilateration process.

FIG. 13 represents a result of performing a conventional trilateration process to determine a location 1006 of the interference source 1004a. The conventional process was able to identify a location 1006 that corresponds to one source of external interference with a reasonable degree of accuracy, but was unable to identify the second source 1004b. The ability to resolve and identify multiple sources of interference in a single geographic area is a substantial advantage of embodiments of the present disclosure compared to conventional technologies, which typically yield a single point in space as an interference location.

The heat map of FIG. 13 was generated using the same data as FIG. 11 and FIG. 12. The conventional process resulted in identifying an interference location 1106 two pixels away from the location of interference source 1104a. In contrast, the Experimental example of FIG. 12 according to an embodiment of a Bayesian process according to the present disclosure indicates a maximum probability of interference source 1104a being less than one pixel away at pixel 1106a. The higher accuracy apparent by comparing FIG. 12 to FIG. 13 is another advantage of embodiments of the present disclosure compared to conventional interference location techniques.

A location for a source of interference is determined at S312. FIG. 12 represents an example of identifying a source of interference, where the pixels representing probability maxima 1106 may be provided as locations with the highest probability of interference being present. In another embodiment, a heat map with a broader distribution of probabilities as represented by FIG. 11 may be provided to identify interference source locations. Persons of skill in the art will recognize that variations in a radio environment may affect measurement accuracy, so a limited distribution of probability values as represented in FIG. 12 may not accurately identify a source of interference. Accordingly, embodiments may use various scales of a probability heat map to identify one or more external source of interference.

In an embodiment, identifying an external source of interference at S312 may involve providing a heat map of probability values to technicians that deploy in the field with RF signal detection equipment to pinpoint the specific physical location and cause of interference. In other embodiments, network personnel may use a heat map or other form of probability distribution data in conjunction with geographic information to identify a source of interference without deploying personnel in a drive test. For example, probability maxima may coincide with a location of an entity that is known to cause interference, such as a television transmitter or radar. An embodiment may automate interference source identification by correlating high probability values and known locations for potential sources of interference.

Process 300 may further characterize the interference with, for example, time and frequency information, that can help a network operator rapidly and efficiently identify its source. For example, time, amplitude and frequency characteristics can be used to determine that interference is from a predetermined source, such as a sparking electrical coupling or a radar installation.

The external interference may be resolved at S314. In an embodiment, resolving the source of external interference may include interfacing with the source of interference to ensure that it no longer transmits in frequencies licensed to a wireless operator. In another embodiment, resolving interference at S314 may include adapting parameters of a wireless communications system to avoid or minimize the impact of a source of external interference.

Although aspects of process 1000 rely on information from multi-sector cell sites that use directional antennas, cell sites with omnidirectional antennas can also be useful for identifying a source of interference. Processes using omnidirectional antennas to locate an interference source may be used in conjunction with the processes disclosed above to obtain more accurate results than would be available using multi-sector cell sites or omnidirectional cell sites alone.

Figure 14:
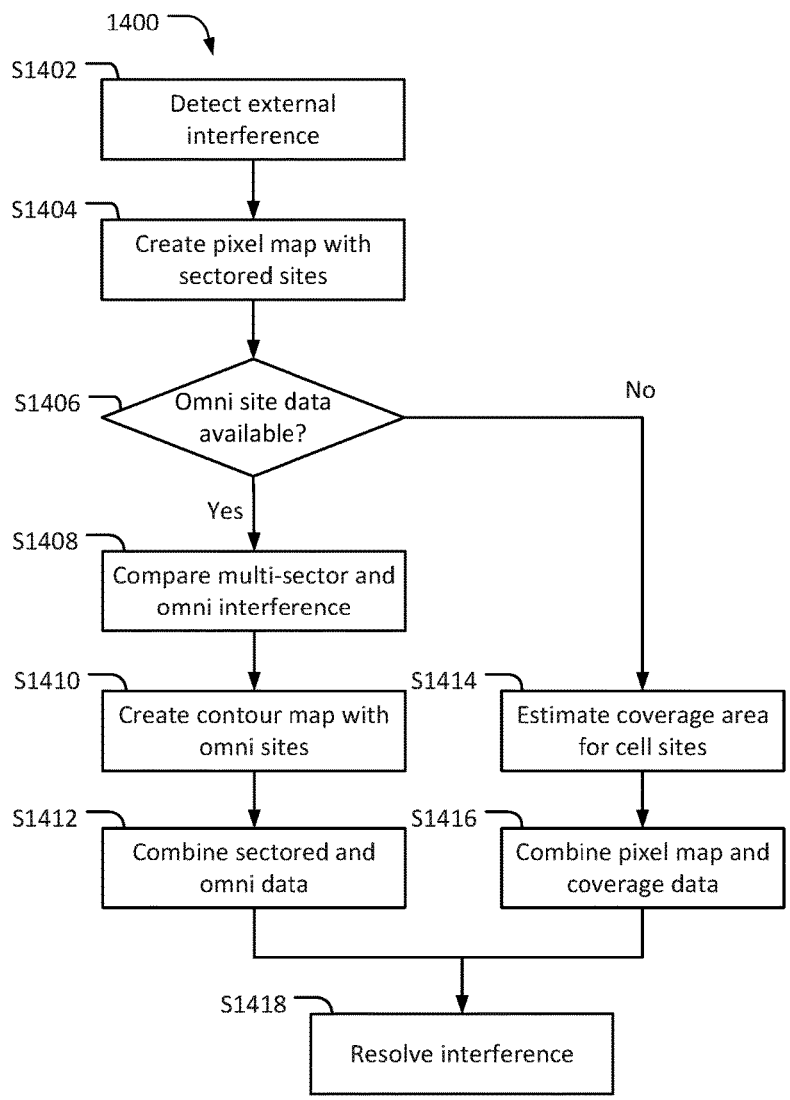
FIG. 14 illustrates a process that uses data from omnidirectional antennas to locate a source of interference.

FIG. 14 shows an embodiment of a process 1400 that uses data from omnidirectional antennas to locate a source of interference. Process 1400 may initiate when external interference is detected at S1402. When external interference is detected, a pixel map may be created for a geographic region affected by the interference at S1404. Both of these elements—S1402 and S1404—may be performed in accordance with process 300. Detecting external interference at S1402 may be performed by detecting external interference at S302, and creating a pixel map may be performed in accordance with one or more of elements S304 to S310. In an embodiment, an output of element S1404 is a probability heat map as described with respect to S310 above.

A system determines whether data from cell sites using omnidirectional antennas is performed at S1406. When data from omnidirectional antennas is available to the system performing process 1400, the system may compare the interference data from the omnidirectional antennas to the interference data from the multi-sector cell sites to determine whether the same interference is affecting both types of antennas at S1408. Comparing the interference data may include comparing one or more characteristic of the interference, such as frequency or time characteristics of the interference signals, etc.

Figure 15:
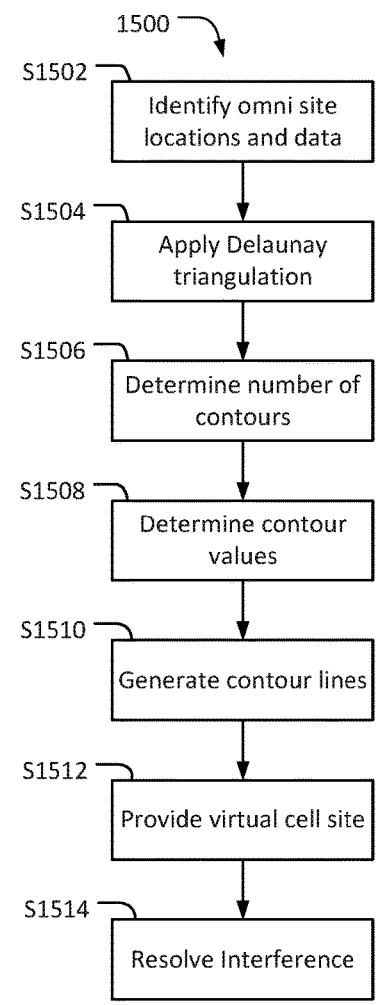
FIG. 15 illustrates a process for creating a signal strength contour map.

The system may create a contour map using data from the omnidirectional cell sites at S1410. An example of such a process is explained in U.S. Pat. No. 9,942,775, which is incorporated herein by reference, and will now be explained with respect to a process 1500 of creating a signal strength contour map shown in FIG. 15.

Figure 16:
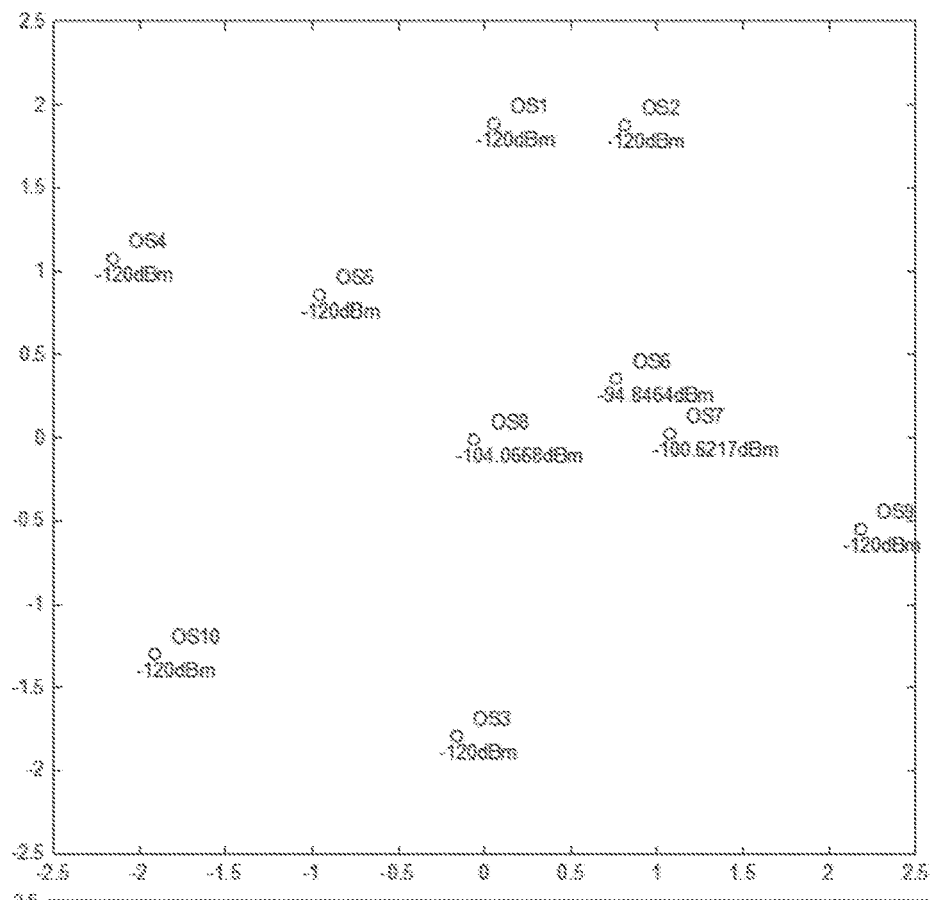
FIG. 16 illustrates interference measurements for omnidirectional antennas.

FIG. 16 shows an embodiment of locations of and interference values at omnidirectional cell sites OS that may be identified at S1502. While most of the sites OS register interference measurements at the noise floor of −120 dB, three of the sites—OS6, OS7 and OS8—have measured levels of interference power that are significantly above the noise floor. Accordingly, data from these cell sites can be useful for identifying the location of the measured interference source.

Figure 17:
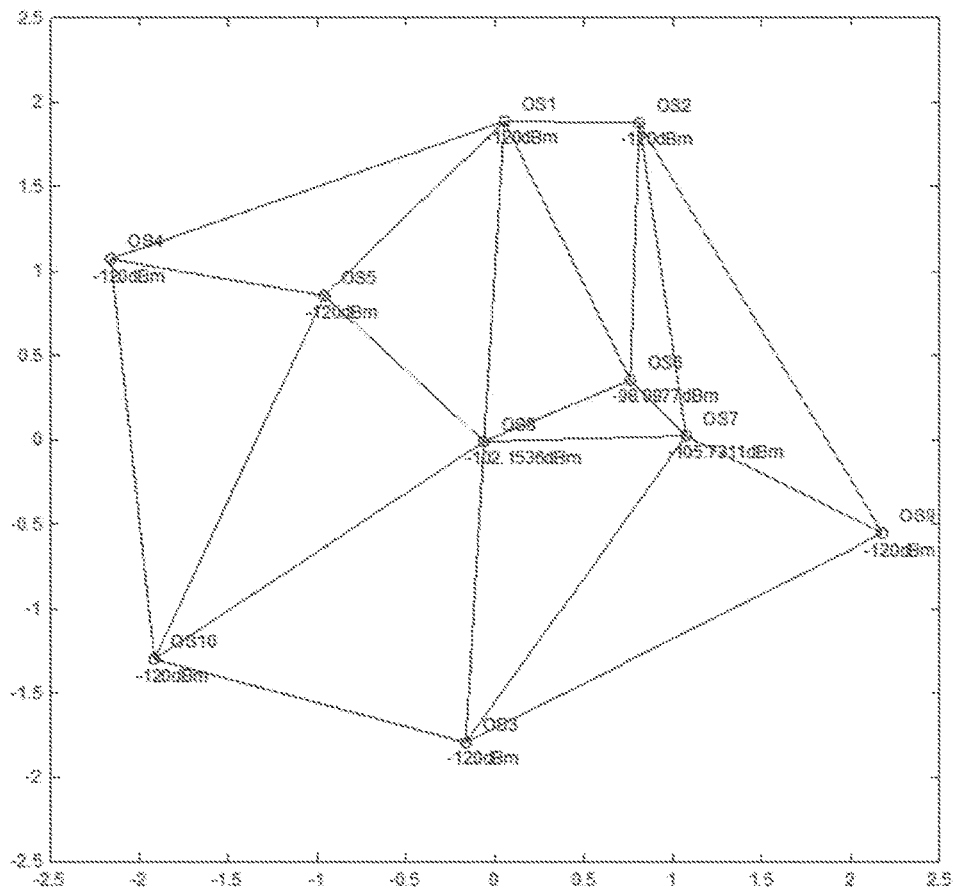
FIG. 17 illustrates a Delaunay triangulation of the omnidirectional antenna measurements.

The omnidirectional sites OS may be connected to one another using Delaunay triangulation at S1504, as seen in FIG. 17. After the sites are connected, a number of contour lines may be determined at S1506. Higher numbers of contour lines increase resolution of the data, but also generally require more resources to generate and analyze.

In the example of affected cells in FIG. 3, the highest interference power is −98.6977 dBm. If 5 contour lines are desired, the difference of highest interference and lowest interference (−120 dBm) is divided by 6 and the resulting interference levels for contour lines are: {−116.4496, −112.8992, −109.3488, −105.7985, −102.2481}. Each of the contour lines may be described as a perimeter line that represents a particular level of interference and defines a bounded shape within the line.

Figure 18:
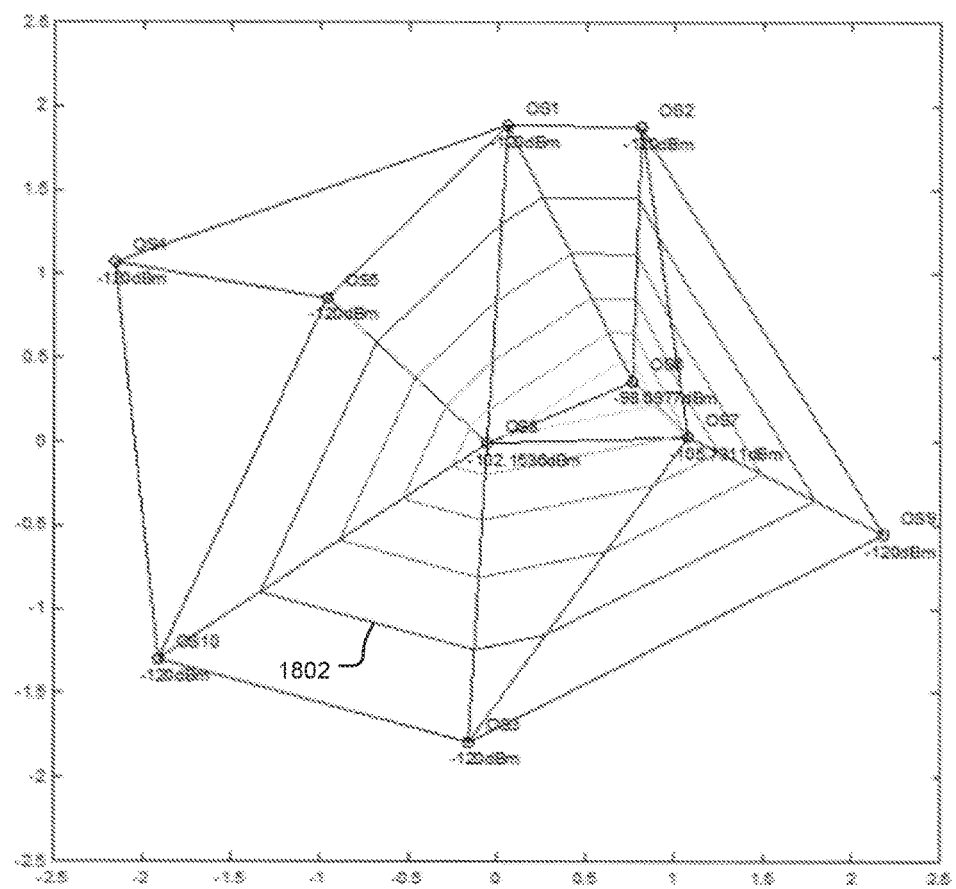
FIG. 18 illustrates a contour map of interference levels.

Locations for the contour values along lines of the Delaunay triangles may be determined by interpolating signal values between the nodes on both sides of the lines. The interpretation may be linear interpolation, but embodiments are not limited to that technique. The interference points are then connected to other points with the same value at S1510 to generate a map with contour lines 1802 as seen in FIG. 18.

Figure 19:
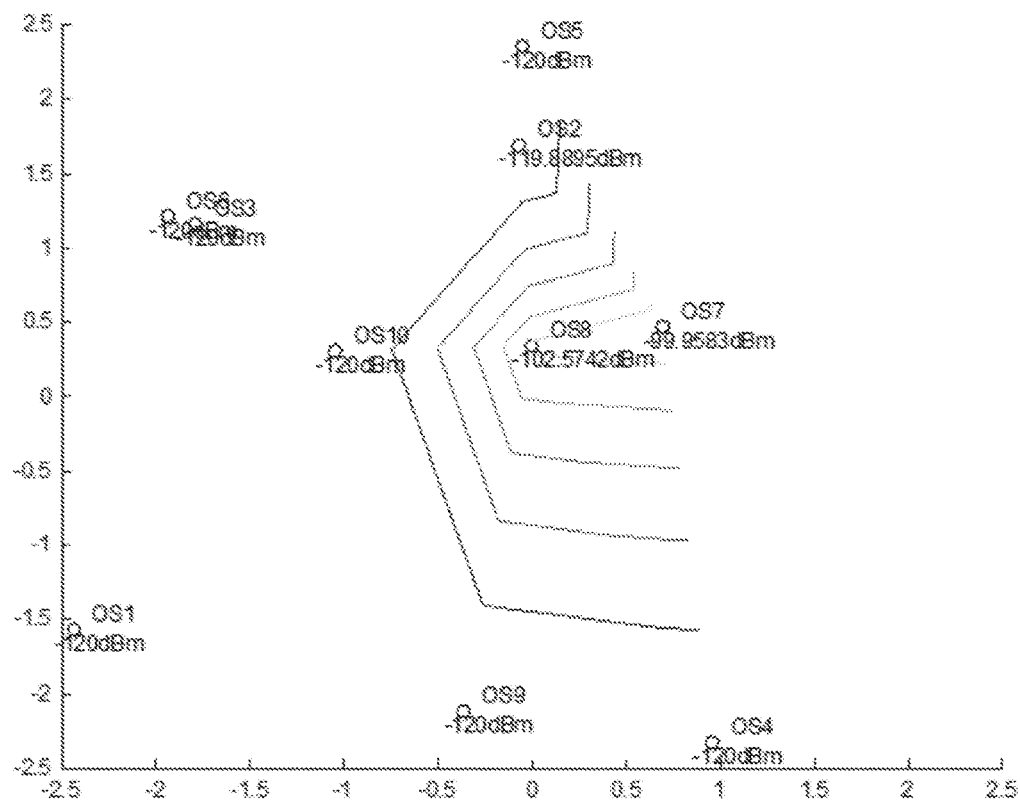
FIG. 19 illustrates an open-sided contour map of interference levels.

FIG. 19 shows an embodiment where limited omnidirectional antenna data is available for a geographic region that is affected by external interference. In the example of FIG. 19, while a sufficient number of omnidirectional cell sites are available on the left side of the figure to establish a set of contour lines, there are no omnidirectional sites on the right side of site OS7, so the contour lines are open ended on the right side of the figure. In these circumstances, closed contour lines can still be established by introducing a virtual cell site at S1512.

A virtual site may be provided at S1512 by adding one or more vertices in the direction of the open end. The approximate distance to a virtual site along a vertex can be obtained using a pathloss model. In the example shown in FIG. 19, assuming the interference source is on the extended line of two affected cells (OS8 and OS7) toward the open area, the distance to a virtual site, where the expected interference level would be noise-floor level, can be obtained according to the following example. The receiver interference power can be written as:

$$P_R = P_T + G_T + G_R - L_T - L_R - PL(d),$$

in which:
- $P_T$ is an external interferer's transmit power in dB,
- $G_T$ is a transmit antenna gain at the interferer in dB,
- $G_R$ is receiver antenna gain at the cells in dB,
- $L_T$ is signal loss at the transmitter, e.g. cable loss, in dB,
- $L_R$ is signal loss at the receiver, e.g. cable loss, in dB, and
- PL (d) is pathloss from the radio channel, including shadowing, in dB, where d is the distance between two locations.

Considering that "$P_T + G_T + G_R - L_T - L_R$" would likely be the same for all omnidirectional sites, the following equalities may be assumed:

$$P_{R\_OS7} + PL(D1) = P_{R\_OS8} + PL(D1+D2) = P_{R\_virtual\text{-}site} + PL(D3),$$

Figure 20:
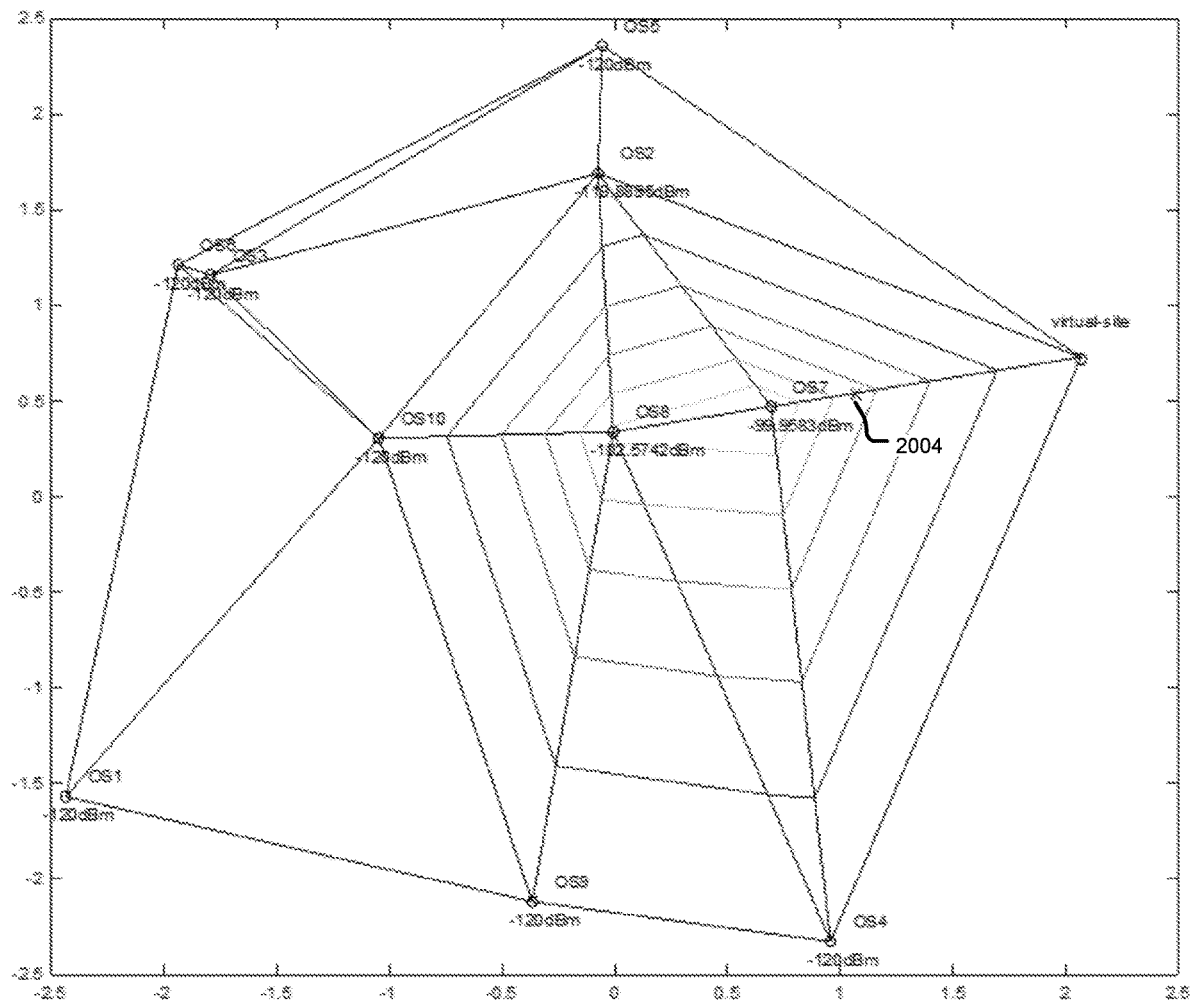
FIG. 20 illustrates a contour map that uses a virtual cell site to close the contours.

With respect to the contour plot in FIG. 20, X is a possible location of an interference source 2004, D1 is distance in meters between X and OS7, D2 is distance in meters between OS7 and OS8, and D3 is distance in meters between X and a virtual site. Calculating values for the Example of FIG. 20 yields $$P_{R\_OS7} = -99.9583 \text{ dBm},$$

$$P_{R\_OS8} = -102.5742 \text{ dBm, and}$$

$$P_{R\_virtual\text{-}site} = -120.0 \text{ dBm}.$$

Using the Hata pathloss model, PL(d)=128.1−37.6 log10 (d/1000), where d=distance in meters, the distance from OS7 to virtual site is obtained as 1.3984 km. Other embodiments may use different pathloss models. After the location of the virtual site is established, interpolation is performed to establish locations of the contour values on each Delaunay triangle line per S1508, and contour lines are generated at S1510 to create a contour map such as the map shown in FIG. 20.

Returning to process 1400 and FIG. 14, after a contour map using omnidirectional cell sites has been created at S1410, the omnidirectional site data is combined with multi-sector cell site data at S1412. In an embodiment, the data is combined by re-assigning the probability values of a pixel map for multi-sector antennas, e.g. a probability heat map from S310, using data from an omnidirectional site contour map.

For example, combining data at 1412 can be accomplished by re-assigning probability by weighting the original probability values as follows:

$$\widehat{Pr}(k) = Pr(k) \cdot Pr_{cont}(k),$$

where $$Pr_{cont}(k) = \begin{cases} p_1 & \text{if pixel } k \text{ is inside of the 1st contour level} \\ p_2 & \text{if pixel } k \text{ is inside of the 2nd contour level and outside of the 1st contour level} \\ \dots & \dots \end{cases}$$

The weights may be established based on the number of affected indoor cells or level of interference. For example, one possible set of weights is $p_1=1$, $p_2=0.5$, $p_3, \dots, p_{N+1}=0$, where N is the number of different contour levels, all the pixels within the highest contour will have a weight of 1 and all the pixels within the second highest contour but outside of the highest contour have a weight of 0.5, and all other pixels will have weight of 0. Other embodiments of contour weights are possible—for example, in some embodiments every contour has a weight that is greater than zero.

After applying weights, the re-assigned probability $\widehat{Pr}(k)$ may be normalized so that the sum of probabilities across all pixels is 1.

Figure 21A:
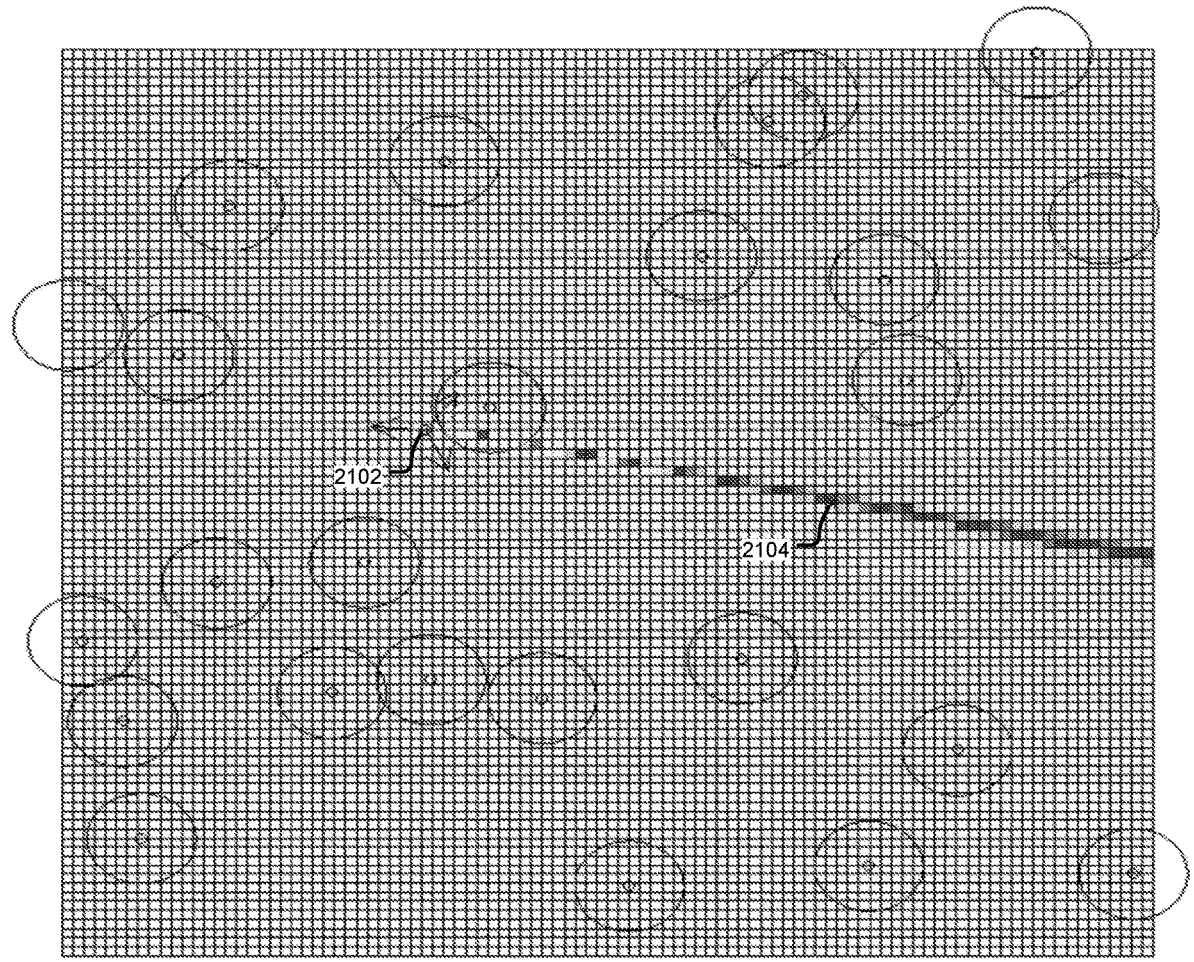
FIG. 21A is a probability map.
Figure 21B:
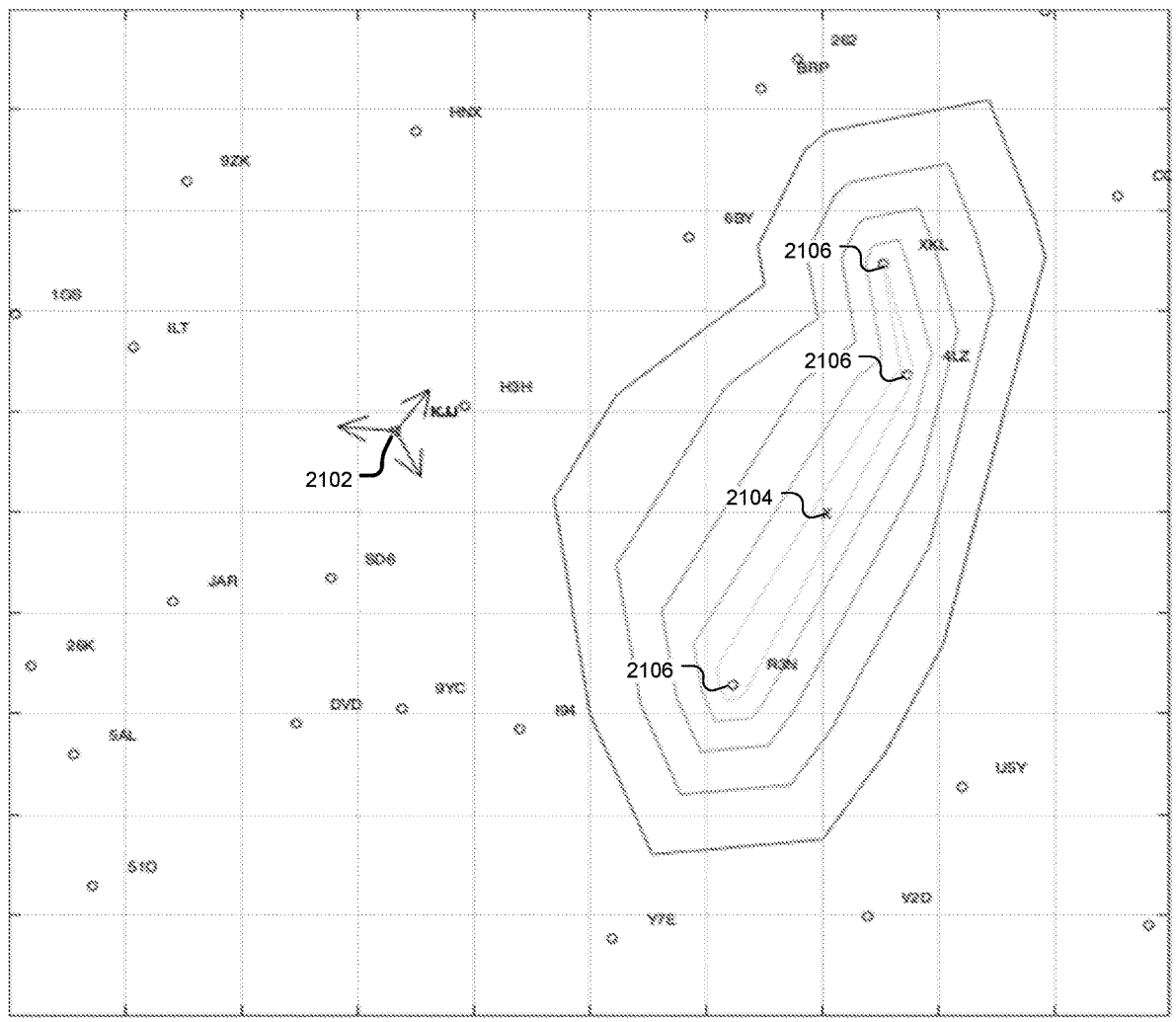
FIG. 21B is a contour map.
Figure 21C:
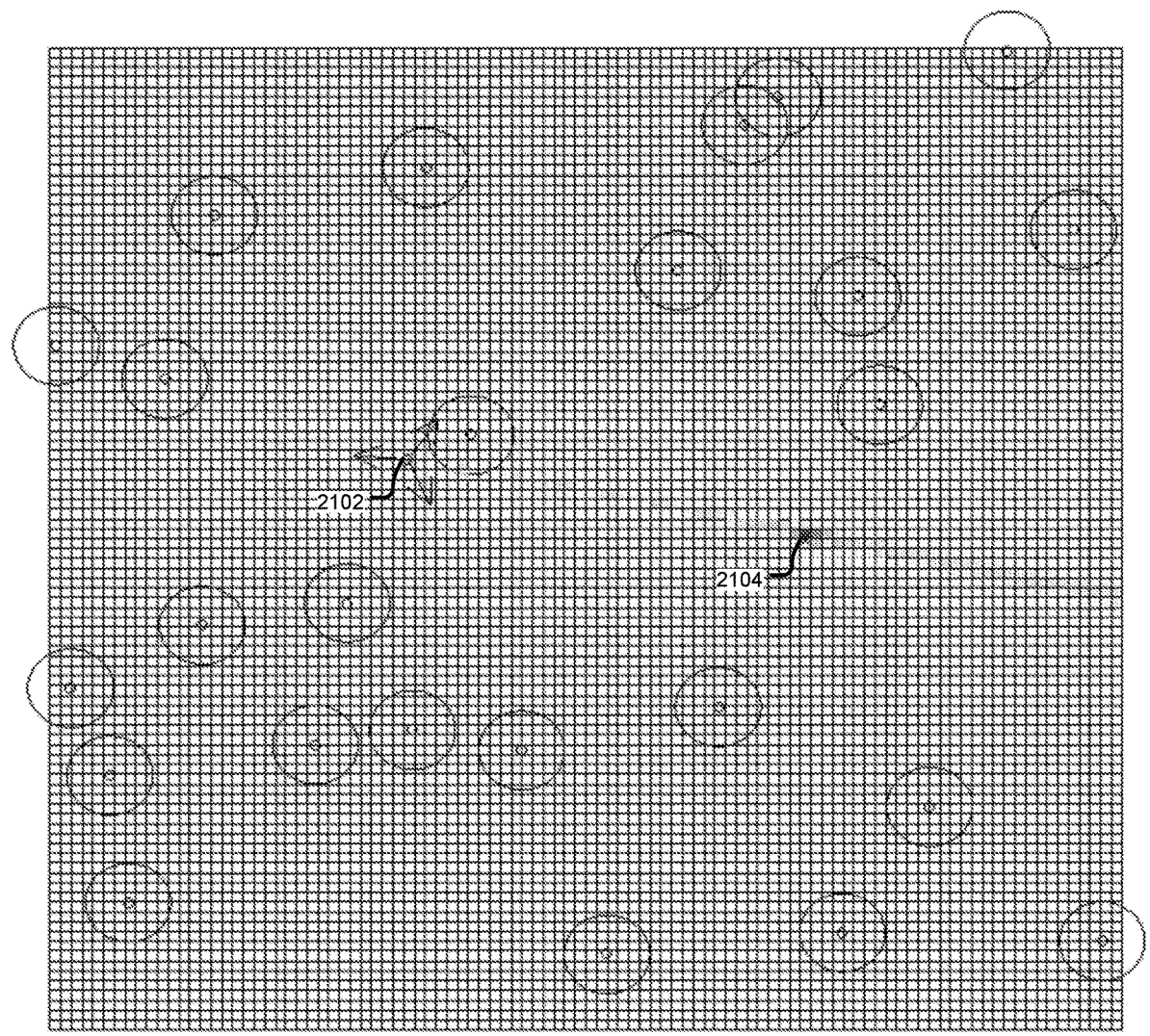
FIG. 21C is a result of combining the probability map with the contour map.

An example of re-assigning probability at S1412 using a tiered weighting scheme for contour levels is shown in FIGS. 21A-C. FIG. 21A shows a probability heat map that was generated using data from multi-sector cell sites using process 300. The resulting probability distribution is an unbounded conical shape that extends to the right from cell site 2102. The probability distribution of FIG. 21A can occur by performing process 300 when the number of cell sites affected by interference is low. Although the source of interference 2104 is within the high probability zone, the size of the high probability zone is relatively large, so it may be difficult to positively locate an interferer using the probability map of FIG. 21A.

FIG. 21B shows a contour map that was created using data from omnidirectional antennas 2106 according to the processes discussed above. When the contour map of FIG. 21B is combined with the probability map of FIG. 21A, the resulting probability distribution is shown in FIG. 21C. In FIG. 21C, the contour map of FIG. 21B has been applied to the probability distribution from FIG. 21A by multiplying the innermost contour by 1, multiplying the second contour by 0.5, and multiplying pixels of all other contours—including pixels outside of the outermost contour—by zero. The resulting distribution is bounded to a limited area, and is a considerably more accurate correlation to the actual location of the source of interference 2104 than the original probability distribution of FIG. 21A.

Figure 22A:
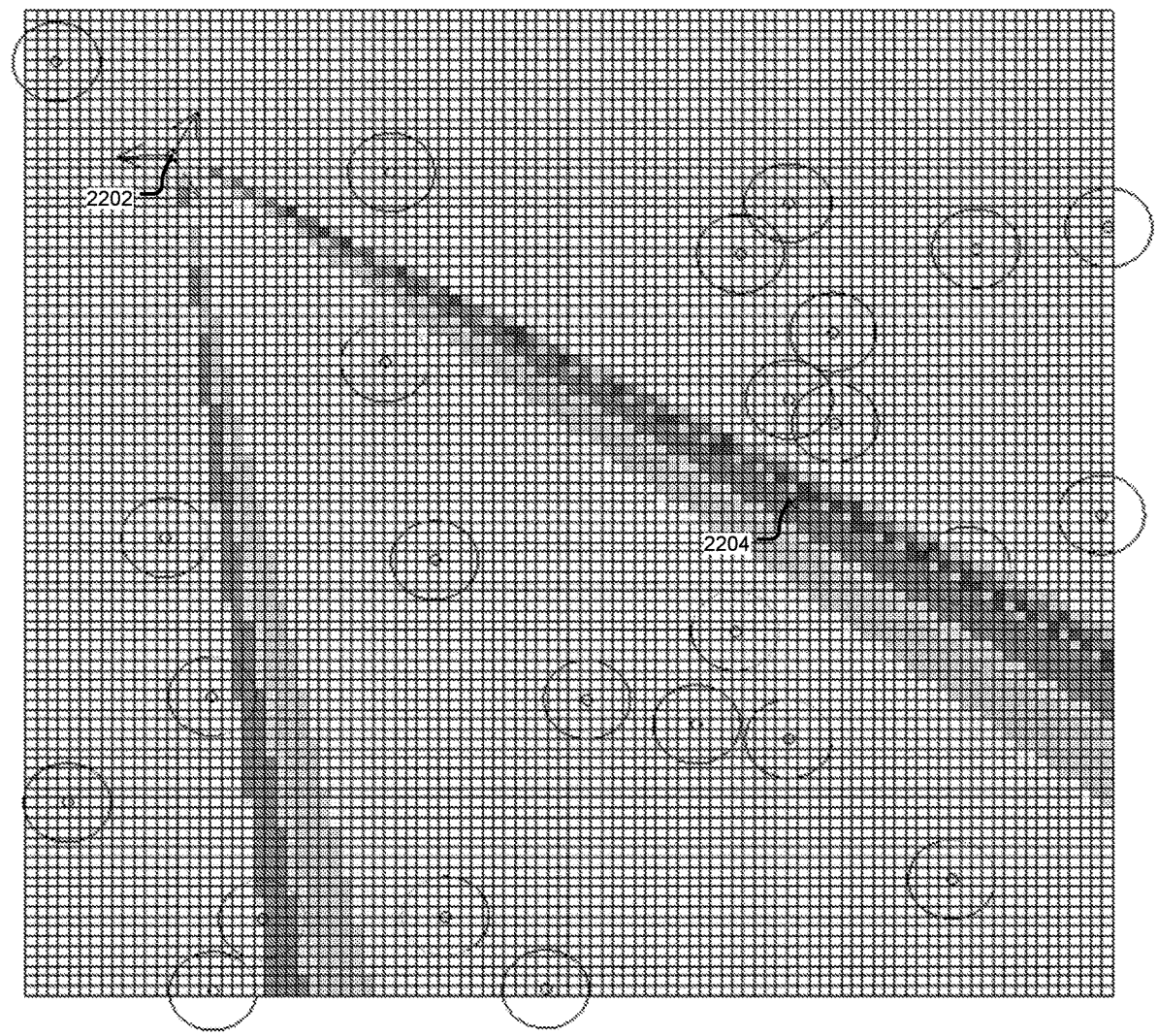
FIG. 22A is a probability map.
Figure 22B:
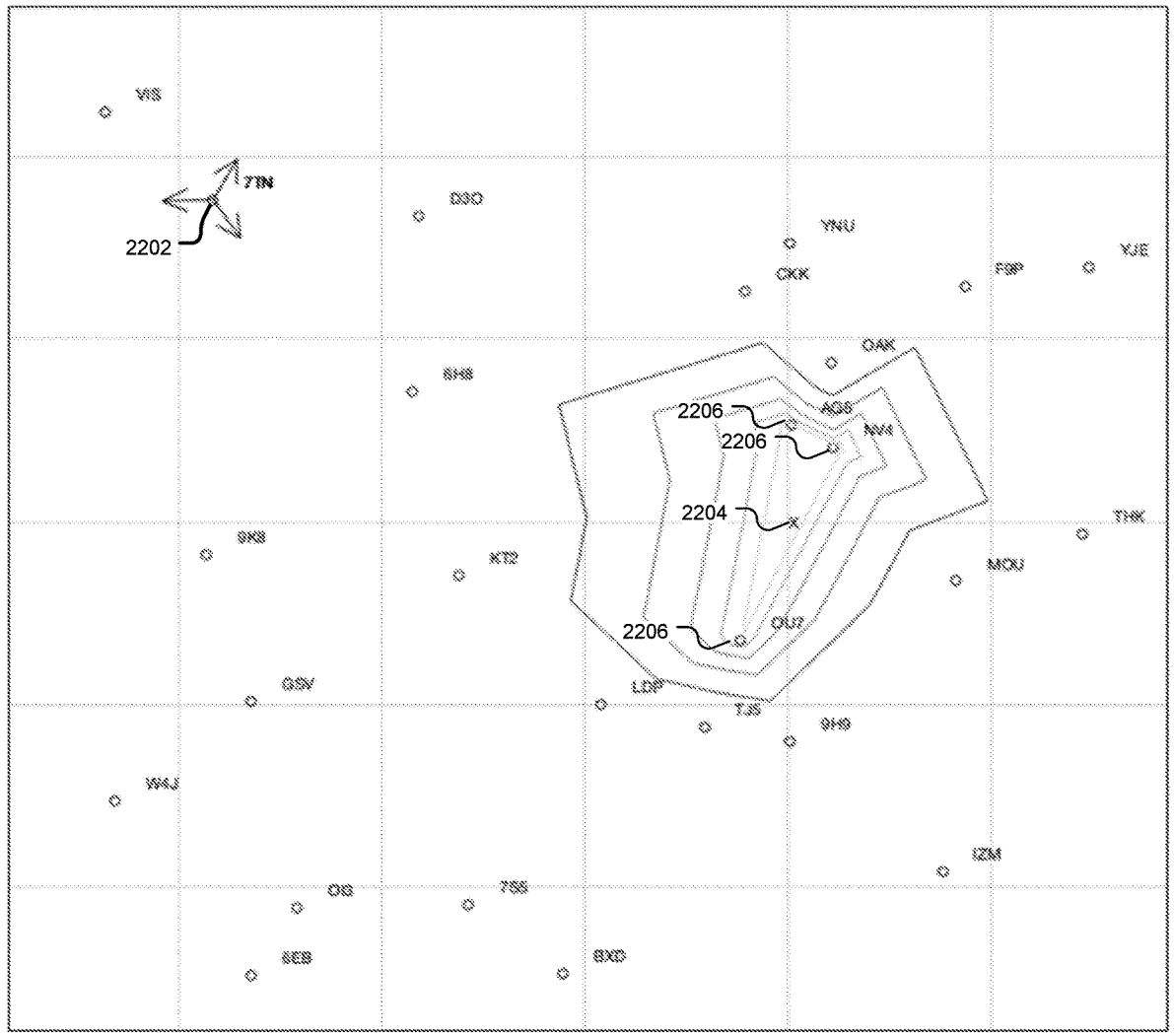
FIG. 22B is a contour map.
Figure 22C:
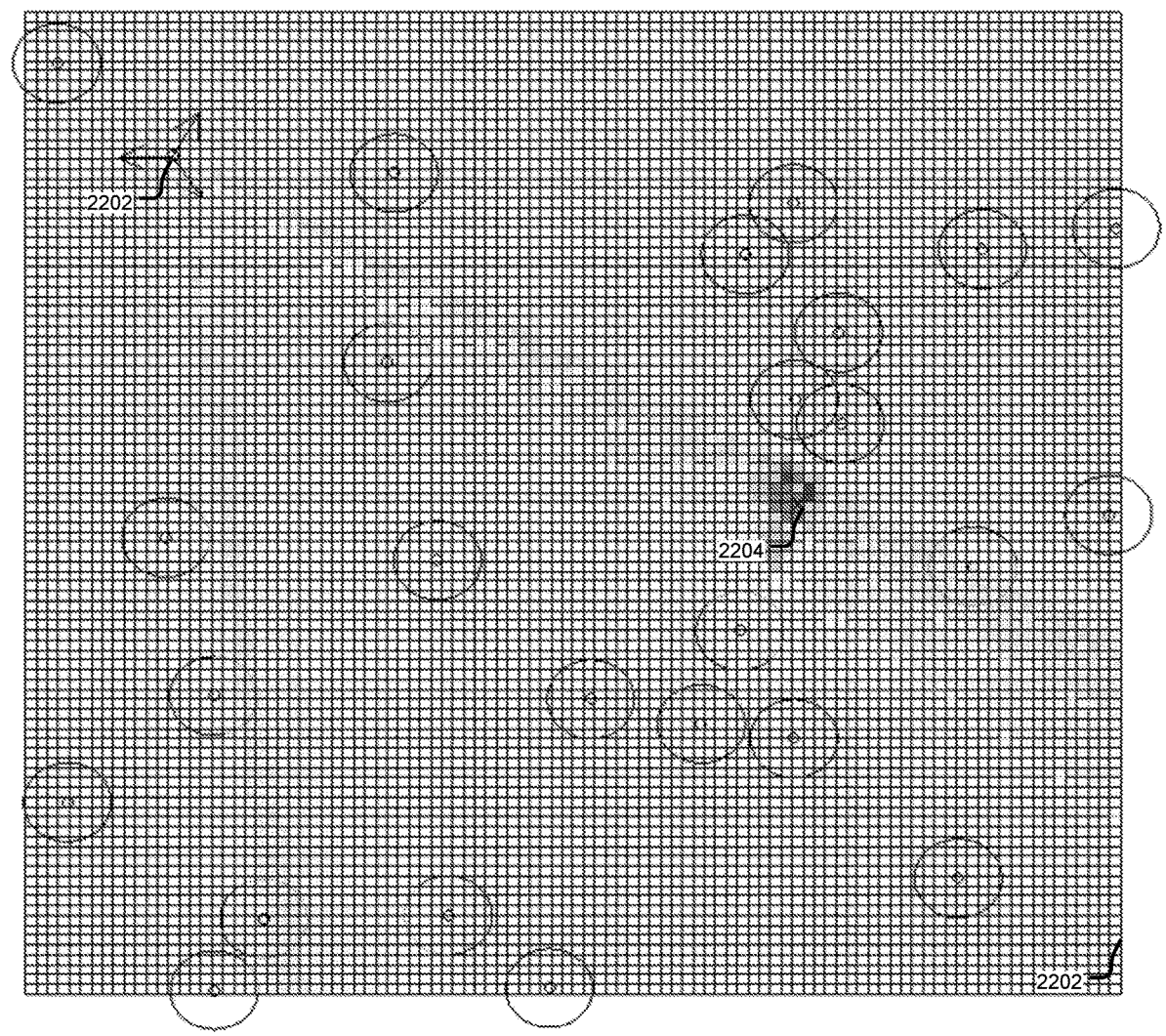
FIG. 22C is a result of combining the probability map with the contour map.

FIGS. 22A-C illustrate another example of combining a pixel-based probability map from multi-sector cell site data with a contour map generated from omnidirectional antenna data. The pixel map in FIG. 22A shows two discrete open-ended distributions emanating from multi-sector cell site 2202 in two distinct directions, and represents a possible outcome from performing process 300. FIG. 22B represents a contour map that was generated using data from omnidirectional antennas 2202 measuring interference from the same source 2204 as FIG. 22A.

When probabilities of the pixel map of FIG. 22A are modified using the contours of FIG. 22B, the utility of the probability distribution is dramatically improved. As seen in FIG. 22C, one of the two open-ended distributions is eliminated entirely, and the shaded geographic area indicating higher probability is much more focused on the actual location of interference source 2204.

Although the embodiments shown in FIGS. 21A and 22A show unbounded probability distributions, it is possible to perform S1410 and S1412 to a variety of localizations. For example, contour maps generated from omnidirectional cell site data can be applied by reassigning the pixel probability distributions of FIGS. 11 to 13, or to other kinds of interference maps. Accordingly, data from omnidirectional antennas can be combined with data from multi-sector antennas to identify a location of a source of interference with a higher degree of accuracy than data from omnidirectional or multi-sector antennas alone.

When omnidirectional antenna data is not available at S1406, process 1400 may improve the accuracy of a probability map using cellular coverage areas. An example of this will be explained with respect to FIGS. 23A-C.

Figure 23A:
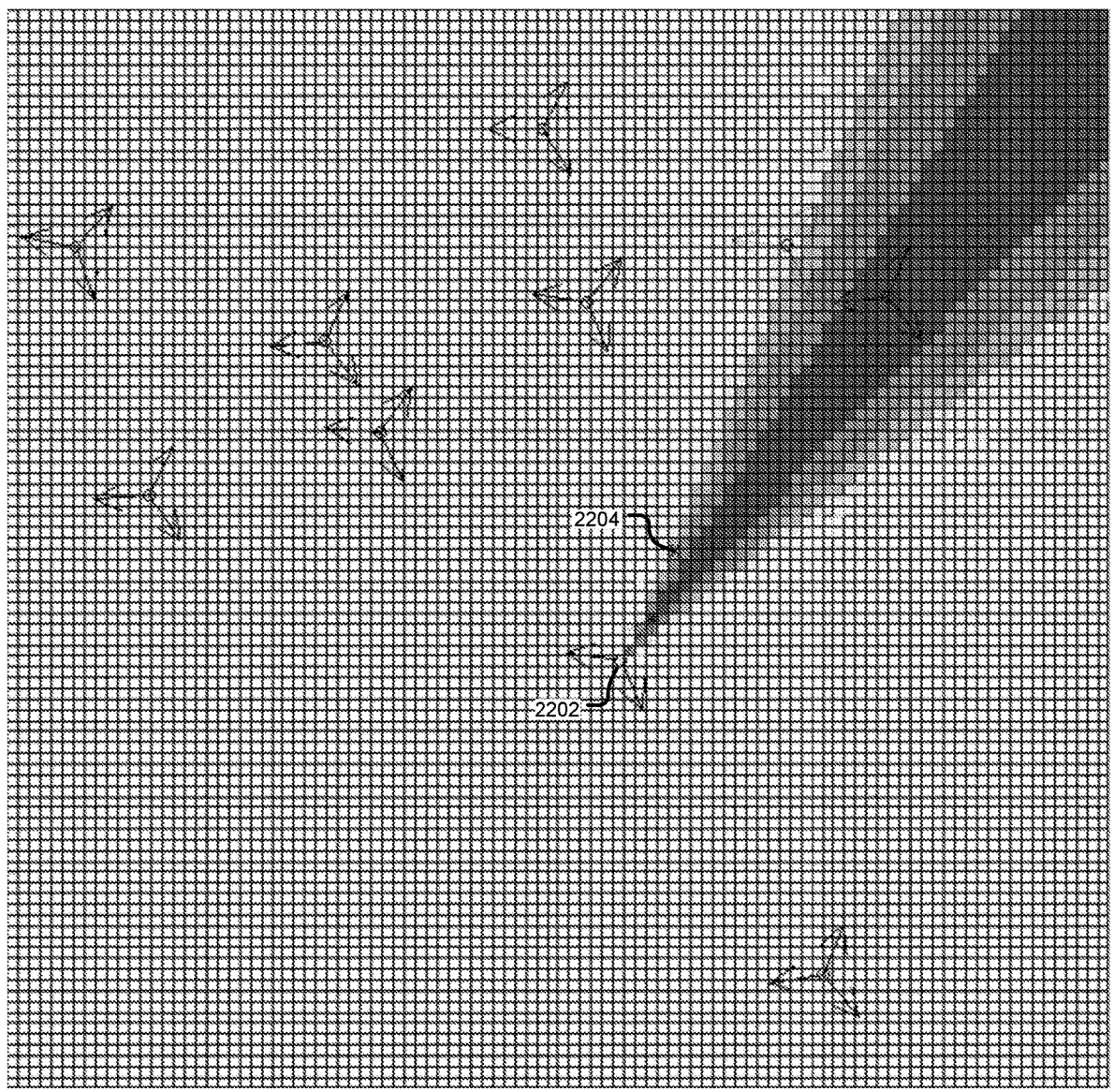
FIG. 23A is a probability map.

FIG. 23A shows a probability pixel map generated using process 300 with an unbounded single probability distribution shape extending from multi-sector cell site 2202 that is similar to the unbounded probability distribution shown in FIG. 21A. However, unlike the embodiment shown in FIG. 21A, no data from omnidirectional antennas is available within the map grid of FIG. 23A.

Figure 23B:
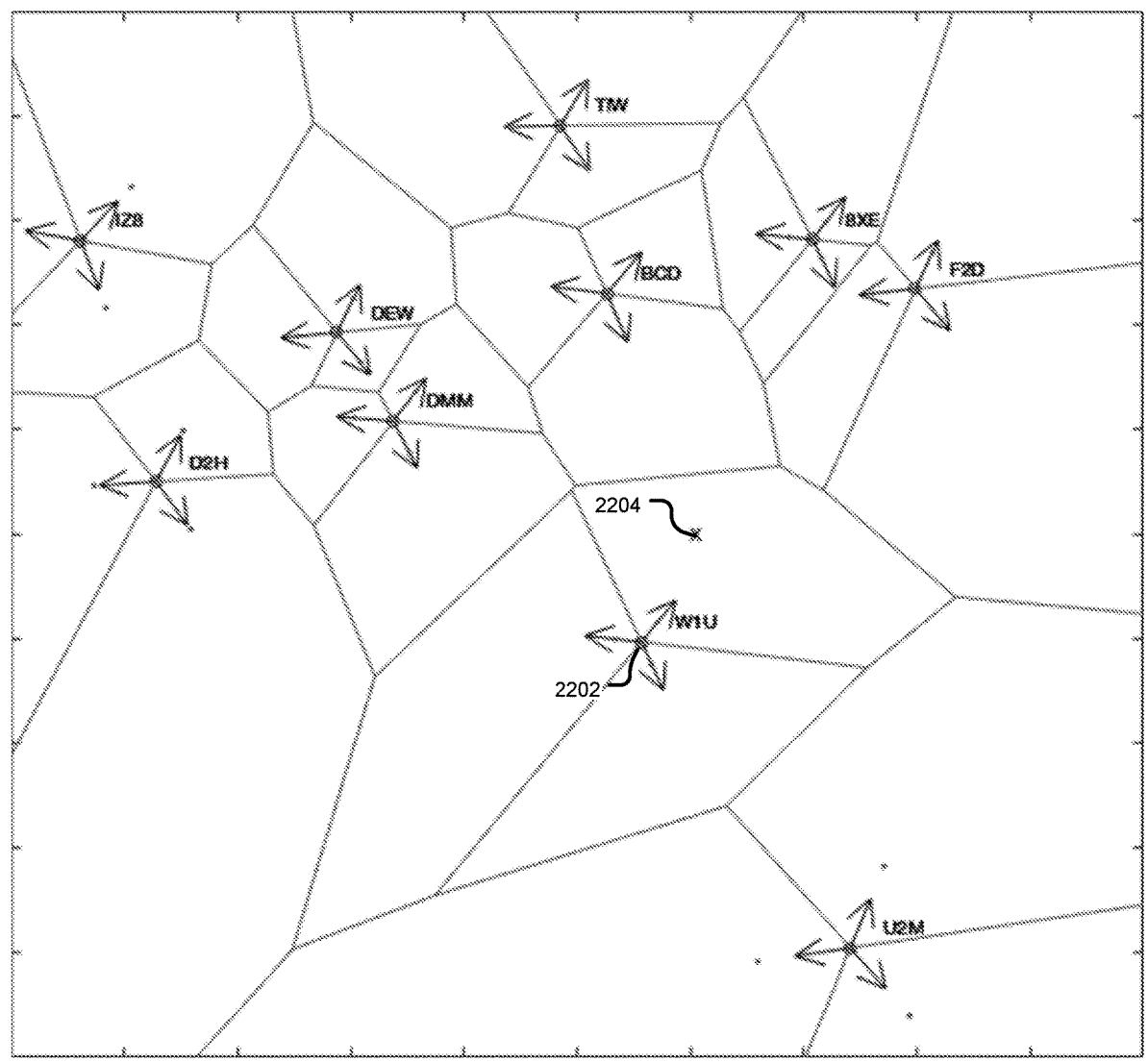
FIG. 23B is a map of coverage estimates.

FIG. 23B shows a result of estimating coverage area for cell sites at S1414. In the embodiment of FIG. 23B, coverage areas for the cellular antennas of multi-sector cell sites 2202 are represented by Voronoi polygons. An example of creating Voronoi polygons to represent cell coverage can be found, for example, in U.S. application Ser. No. 15/076,539. However, embodiments are not limited to the Voronoi polygons shown in FIG. 23B—in other embodiments, cell coverage areas could be represented by other shapes, including curved shapes and shapes that overlap one another. In an embodiment, cell coverage areas from a planning tool or pre-existing database could be used.

Figure 23C:
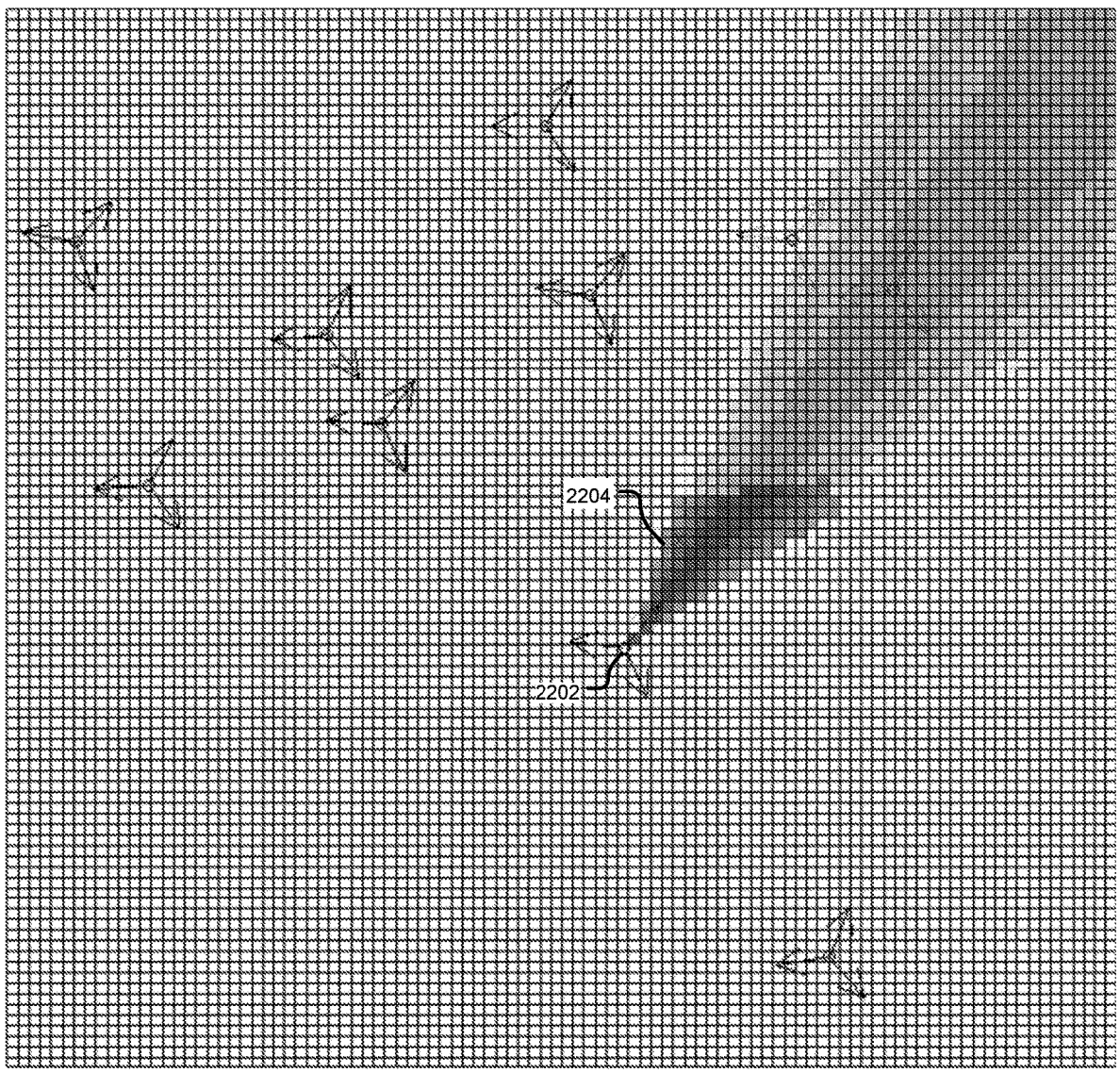
FIG. 23C is a result of combining the probability map with the map of coverage estimates.
Figure 28A:
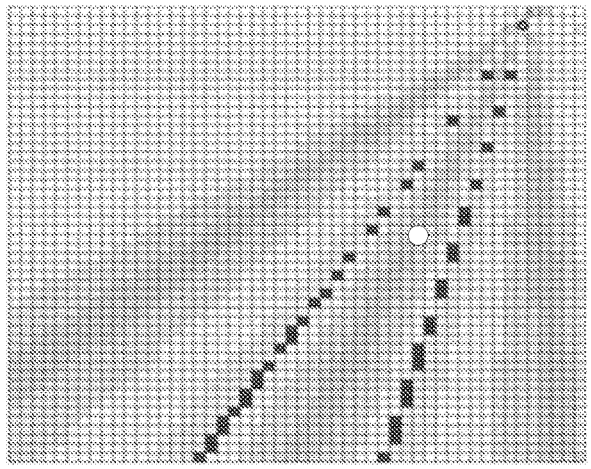
FIGS. 28A, 29A, 30A and 31A illustrate pixel probabilities using horizontal gain.
Figure 28B:
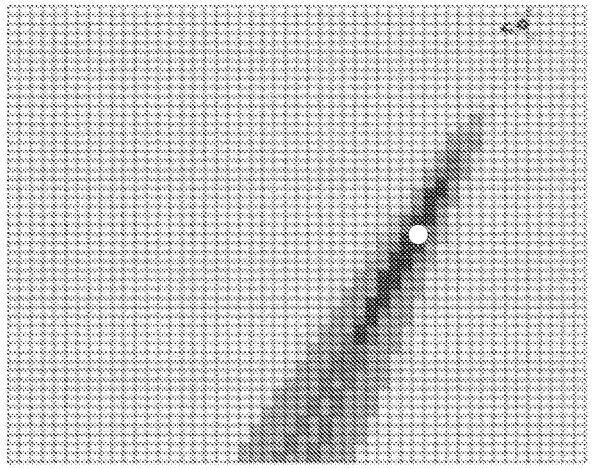
FIGS. 28B, 29B, 30B and 31B illustrate pixel probabilities using horizontal gain and vertical gain.
Figure 29A:
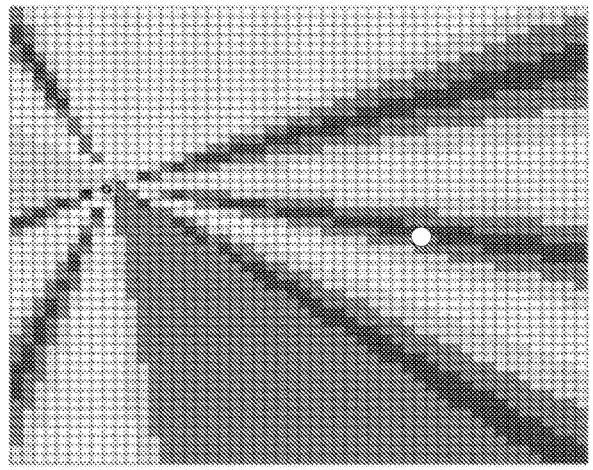
Figure 29B:
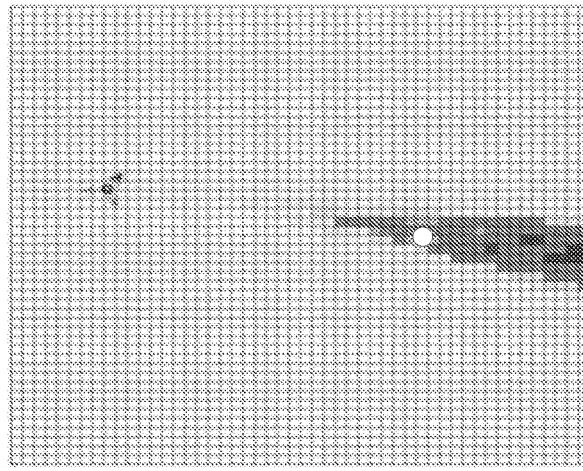
Figure 30A:
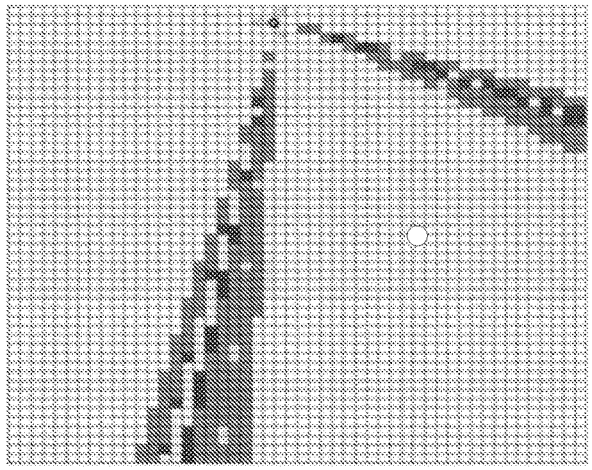
Figure 30B:
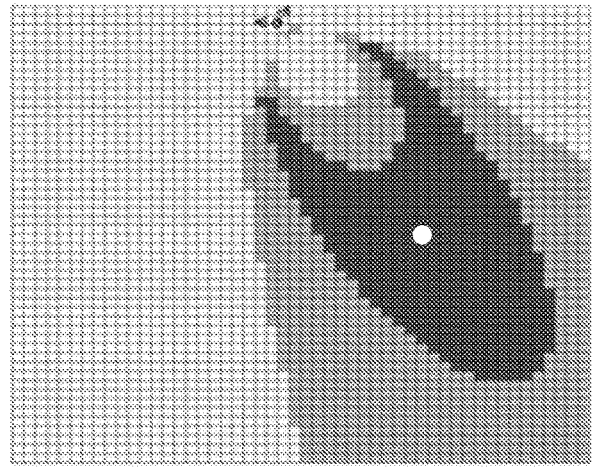
Figure 31A:
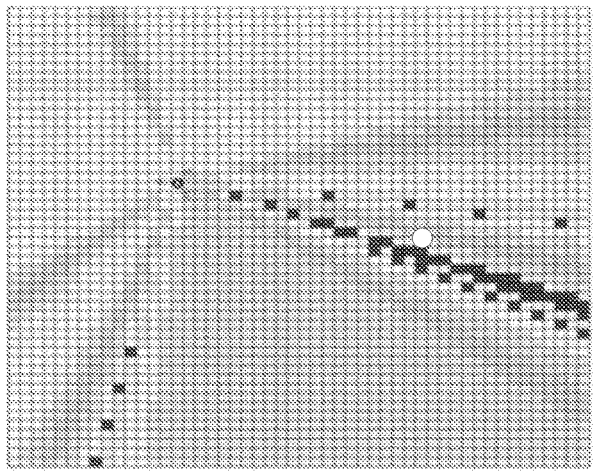
Figure 31B:
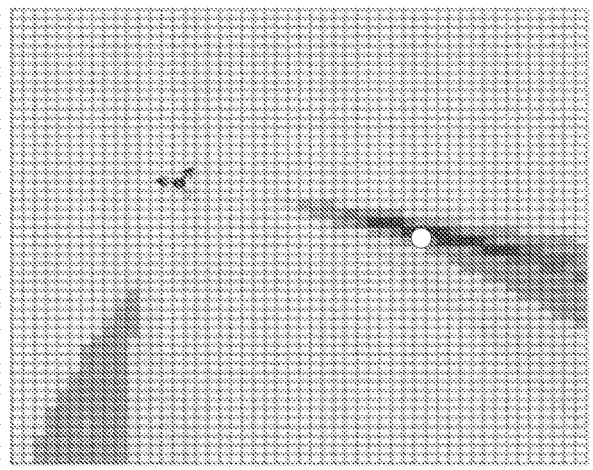

The cell coverage data of FIG. 23B is combined with the probability map of FIG. 23A at S1416 to identify the location of interference source 2204. In the embodiment of FIG. 23C, the data is combined by attenuating probability values from FIG. 23A according to the coverage shapes of FIG. 23B. The re-assigned probability can be expressed as:

$$\widehat{Pr}(k) = Pr(k) \cdot Pr_{cov}(k),$$

where $$Pr_{cov}(k) = \begin{cases} p_1 & \text{if the pixel } k \text{ is inside of voronoi polygon of an affected cell,} \\ p_2 & \text{if the pixel } k \text{ is inside of voronoi polygon of adjacent cell,} \\ p_3 & \text{otherwise.} \end{cases}$$

$\widehat{Pr}$ may be normalized so that the sum of probabilities across all pixels is 1.

In the example of FIG. 23C, values for $p_1$-$p_3$ are {$p_1$=1, $p_2$=0.5, $p_3$=0.5}. However, these values are merely an example, and other values are possible in other embodiments. For example, embodiments may use coverage areas that are ranked according to the level of interference measured by the cell. In other embodiments, e.g. embodiments with high accuracy coverage areas, antennas that do not detect interference may be excluded by applying a weighting of zero.

Although the examples of FIGS. 23A-C show data using multi-sector cells, omnidirectional antennas can be used at S1414. In such an embodiment, coverage area of an omnidirectional cell site may be represented as a circle centered at the site, and the size of the circle may be scaled based on the coverage area of the omnidirectional cell. The interference detected by the omnidirectional antenna may be correlated with the interference detected by the multi-sector cell before re-assigning probabilities of the probability map.

Finally, interference may be resolved at S1418, for example by providing a physical output that identifies one or more probable location for an interference source. The map may be a cartesian map indicating geographic coordinates such as latitude and longitude, and may have an element that identifies a cardinal direction, such as true north. The map may be output by printing ink onto paper, or displayed on one or more electronic screen. An electronic version of data associated with the map may be stored in a computer memory, and that data may be transmitted to individuals or organizations involved in interference detection and localization in wireless telecommunication networks.

In other embodiments, resolving interference at S1418 may be performed in accordance with the explanation of resolving interference at S314 described above.

Embodiments of the present disclosure represent numerous improvements to interference detection technology. As seen with respect to FIGS. 11-13, embodiments can identify multiple discrete sources of interference within a predetermined geographical area. In addition, testing performed by the inventors has established that embodiments of the present disclosure are more accurate than conventional techniques used in the wireless industry. One reason for improved accuracy is that embodiments can use measurement data from a cell site even in a case where only one antenna measures interference levels above the noise floor. In addition, embodiments can provide a range of probability values across a geographic area.

Although much of the discussion above relates to two-dimensional characteristics in the horizontal plane, the accuracy of locating an interferer can be improved by considering vertical characteristics. Many network areas, such as mountainous regions, have complex geometry, and antenna gain patterns vary in all three dimensions. Therefore, processes for locating an interference source using data from cell sites can benefit from considering the effects of antenna gain and relative location of a potential interference source in the vertical dimension.

FIG. 24 shows an embodiment of a process 2400 for determining three-dimensional antenna gain. Process 2400 is not an exclusive process, and may be performed in conjunction with other processes discussed by this disclosure. In particular, process 2400 may be performed in conjunction with the Bayesian process 500 for determining probabilities, which is in turn performed as an element of process 300 for determining a location of an external source of interference. Specifically, vertical antenna gain may support determining hypothetical interference levels at S504.

Topographical characteristics of a pixel grid area established at S306 are determined at S2402. Topographical characteristics may be retrieved from a source such as a global information system (GIS) database, a municipal entity such as the United States Geological Survey (USGS) in the U.S., or publicly available data such as the SRTM (Shuttle Radar Topography Mission) dataset. The topographic data may include elevation characteristics for man-made structures as well as ground-level information, and may include foliage characteristics as well.

The topographical characteristics are applied to pixels in grid pattern 404 at S2404 so that each pixel has at least one elevation value. In an embodiment, the elevation value for a pixel is determined using a statistical technique, e.g. by using a mean, median or mode of topographical data for the area covered by a pixel. Applying topographical characteristics to pixels may include fitting a curve through elevation values from topographical information for an area associated with the pixel. The curve may be useful, for example, for determining whether line of sight conditions exist between pixels and cell sites.

When determining an angle of arrival between a cellular antenna and a potential source of interference, ground level data may be used, which effectively assumes that the interference source is located on the ground. In some embodiments, the elevation level for a pixel may be offset from ground level based on typical heights of sources of interference. For example, embodiments may analyze the interference to determine a likely source, e.g. a sparking transformer or an unlicensed cellular transmitter, and then apply elevation offsets associated with those interference sources. Transformers are typically installed at about the same height on utility poles, so when interference analysis suggests that the source is a transformer, the elevation value of a pixel may be offset by an estimated transformer height.

Antenna characteristics of cell sites in the grid are determined at S2406. Antenna characteristics that may be determined at S2406 include mechanical tilt, electrical tilt, vertical 3 dB beamwidth, antenna height and ground level elevation. The antenna characteristics may be used to determine the probabilities of a source of interference being located at pixels and to determine whether a line of sight exists between the pixels and an antenna, so S2406 may include determining characteristics that are helpful to those activities.

The antenna characteristics may be determined and stored in a memory which is updated when network settings are changed. Antenna characteristics may be retrieved from an operator's database, e.g. from configuration management data. In some embodiments, one or more antenna characteristic is determined using manufacturer data that is specific to a model of antenna.

Depending on the topography of an area around the cell sites, antenna tilt could have a negative value, where the antenna is tilted upward compared to the horizontal level. For example, an antenna that is located down at the base of the valley and it is covering users on valley walls could be pointed upwards.

The antenna characteristics may be used to calculate an angle of arrival at S2408. An angle of arrival for an antenna may be calculated by applying mechanical tilt to the antenna, and then establishing an angle between the antenna and a pixel, as seen in FIG. 25 and FIG. 26. In particular, establishing the angle may be accomplished as described in $3^{rd}$ Generation Partnership Project (3GPP) publication TR36.814, elements of which are indicated in FIG. 25. In various embodiments, elevation data for cellular antennas that is used to determine probability values for pixels may be a base elevation of a cell site or an elevation of the antennas on the cell site.

FIG. 25 shows an example of applying mechanical tilt β to an antenna in vertical and horizontal dimensions. In some embodiments, mechanical tilt may be calculated using tilt values to establish a pointing direction of an antenna in three dimensions.

FIG. 26 illustrates an embodiment of calculating an angle of arrival θ between a pixel $P_4$ and cellular antenna 2602. The pixel that is being evaluated in FIG. 26 is pixel $P_4$, which is four pixels away from cell site 2604. Each of the pixels $P_1$ to $P_4$ has a different elevation relative to the elevation of cell site 2604. The pixel elevation values are derived from topographical information for the associated terrain, a profile of which is shown in the figure.

No mechanical tilt is present in the example of FIG. 26. Therefore, a vertical angle of arrival θ between pixel $P_4$ and antenna 2602 can be determined geometrically using the elevation of Pixel $P_4$, the base elevation of cell site 2604, the height h of antenna 2602 above the base elevation of the cell site, and the horizontal distance between pixel $P_4$ and cell site 2604. Similarly, a horizontal angle of arrival can be calculated from the azimuth direction of the antenna, accounting for mechanical tilt.

Vertical gain is determined at S2410. FIG. 27 shows an embodiment of how vertical gain can be calculated using an angle of arrival, electrical tilt, 3 dB beamwidth and front-to-back ratio according to a 3GPP model. Vertical gain can then be combined with horizontal gain at S2412 to create a three-dimensional gain pattern. An example of such a combination is also provided in the bottom row of FIG. 27. In other embodiments, gain data is available from another entity such as an operator or manufacturer, and that data can be used along with geometric data to determine a hypothetical interference level at S504.

When there are multiple sites which are affected by an external interference signal, the accuracy of identifying an external interference location is close to a function of inter-site distance even when only the horizontal antenna gain is used. However, in some scenarios, such as when only one site is affected by the external interference or the interference source is located close to a cell site, the outcome of an interference locating algorithm that only uses horizontal gain may result in a large number of pixels with a relatively high probability of being a location of an external interference source. Those scenarios are substantially improved by using three-dimensional antenna gain to determine probabilities. For example, FIGS. 28A-31A show pixel probability results using horizontal gain and not vertical gain, while FIGS. 28B-31B show pixel probabilities that were generated using three-dimensional antenna gain. In each of those figures, the actual location of the source of interference is indicated by a white circle.

In some embodiments, topography data can be included in the Bayesian calculation by evaluating if the radio link between a site and a pixel is line-of-sight (LOS) or non-line-of-sight (NLOS). This can be done by evaluating if a line of sight between each pixel and antenna intercepts with the intervening topography. A probability can then be assigned based on the likelihood of an interference signal originating from a pixel reaching the antenna, which may include taking into account propagation via diffraction, a determination of other additional path losses, or incorporation of other propagation effects.

Figure 32:
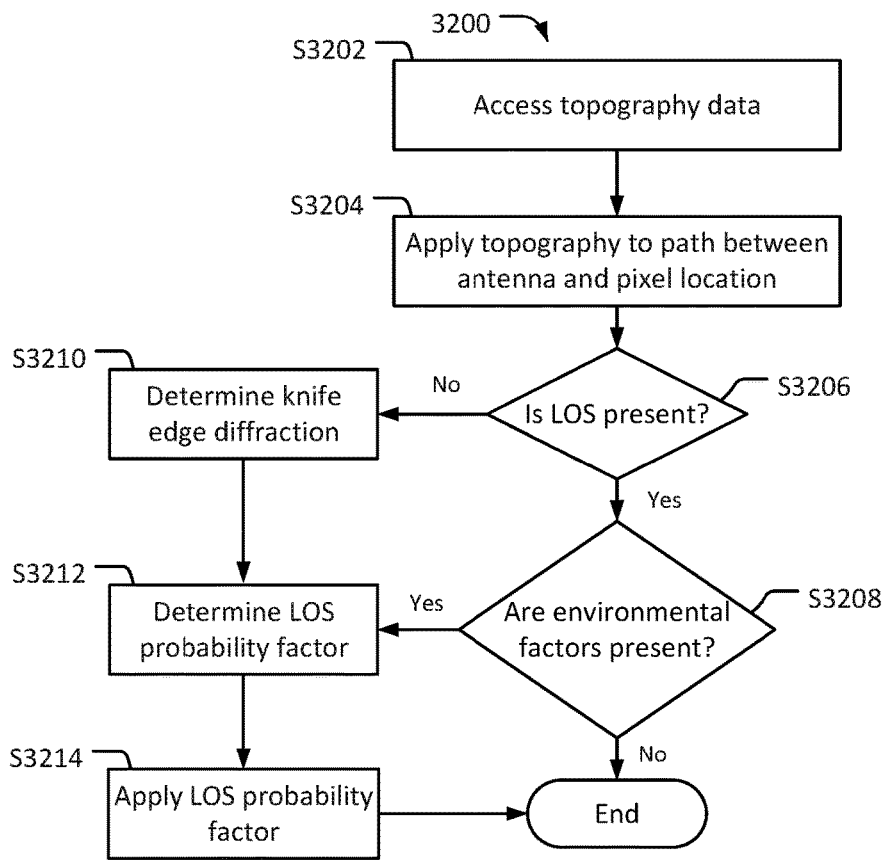
FIG. 32 illustrates an embodiment of a process for evaluating line of sight conditions.

FIG. 32 illustrates an embodiment of a process for determining the probability that an interference source is present at a location based on LOS conditions between a cellular antenna and the location. The process may initiate by accessing topography data at S3202. The topography data may be data that was stored when performing S2402, e.g. topography data that is used to determine the elevation of pixels. In some embodiments, S3202 includes retrieving topography data from an external database.

Figure 33:
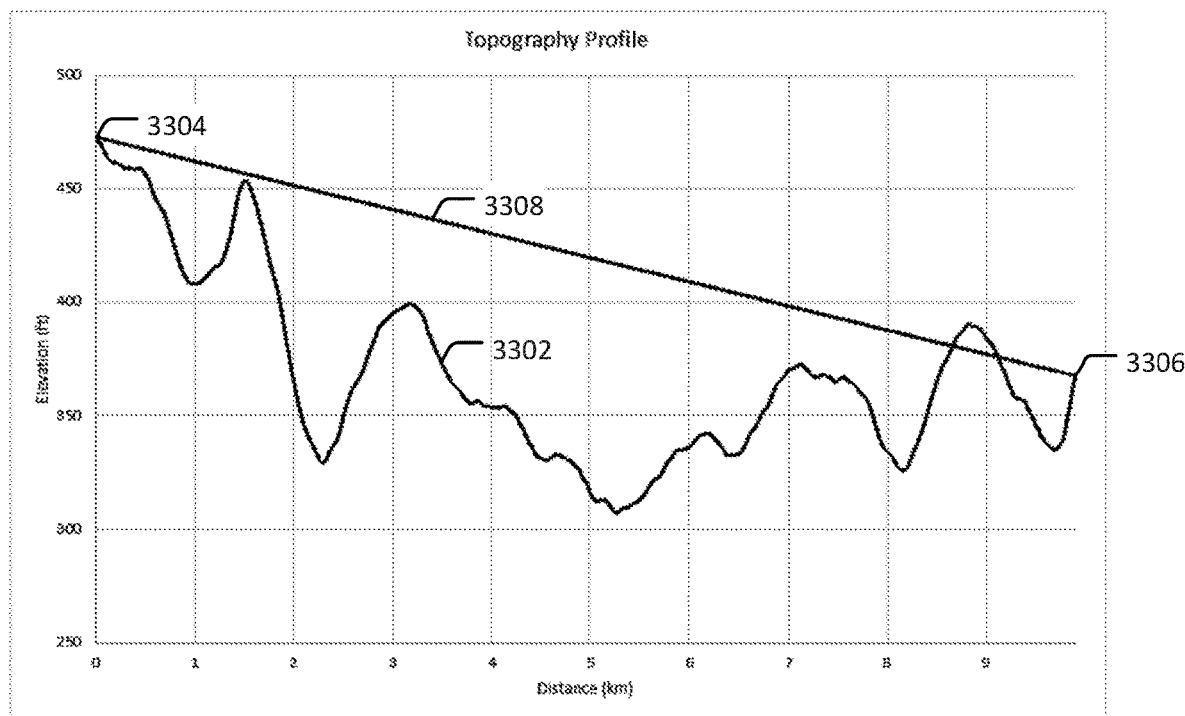
FIG. 33 illustrates an embodiment of determining whether a line of sight is present.

FIG. 33 illustrates an embodiment of applying topography data 3302 to a path between an antenna 3304 and a pixel location 3306 at S3204. The topography data 3302 in FIG. 33 is derived directly from a topographical map. In another embodiment, topography data may be derived from pixel elevation data, where each pixel represents a single elevation point or plane.

The process determines whether a LOS is present at S3206 by establishing a line 3308 in the topography profile between the antenna 3304 and pixel location 3306. When LOS is not present, or the radio link is NLOS, a LOS probability of less than 1 is assigned to the pixel.

The presence of environmental factors that could influence radio propagation may be determined at S3208. Examples of these factors include foliage and buildings. Buildings and foliage can inhibit radio propagation even when LOS is present based on ground-level topography data. The presence of buildings and foliage can be determined from the same sources as topographic information, including GIS data, USGS data and survey data.

S3208 may determine whether environmental factors are present at one or both of pixel location 3306 and an area or pixel in which antenna 3304 is located. In some embodiments, an environmental layer is applied to a ground level topography layer to determine whether environmental factors are likely to be present in LOS path 3308 when it is not otherwise blocked. Other factors that influence radio propagation may be considered at S3208 as well, such as atmospheric conditions. Examples of atmospheric conditions include fog, clouds, humidity and pollution.

The presence of propagation due to diffraction (e.g., knife edge or other type of diffraction) may be determined at S3210 using factors such as the extent to which LOS is blocked in the vertical and horizontal dimensions.

If one or more of the factors from S3206, S3208 and S3210 are present, a LOS probability factor is determined at S3212 based on those factors. For example, if there is one diffraction path between a pixel and site antennas, then a lower LOS probability (e.g., 0.1) may be assigned to the pixel. If there are two diffraction paths between the pixel and site antennas, then an even lower LOS probability (e.g., 0.01) may be assigned to the pixel. If LOS is present but environmental factors are also present, a probability factor of less than 1 may be applied. The precise value of the probability factor for environmental factors may depend on the type of factor and the extent of that factor, so that a dense forest would have a lower probability factor than trees in an urban park.

Otherwise, when no LOS is present and no diffraction path is present, a very low LOS probability factor (e.g., 0.001 or lower) may be determined at S3212, and applied to the pixel at S3214.

Conventional approaches to locating an interference source suffer from many shortcomings. Trilateration and triangulation have much lower accuracy, and generally yield a single point in space. Conventional approaches cannot typically identify locations of multiple sources of interference. When multiple sources of interference are present, location results of conventional localization techniques used in the wireless industry are incapable of identifying two separate sources, and the accuracy of identifying the location of a single interference source may be substantially compromised.

Operators use drive testing to locate external interference, where personnel are deployed to an area in which the source of interference is thought to be located. The personnel may use RF detection equipment to home in on an interference source while canvassing the area in which the interference is thought to be located. The operators may temporarily shut down normal network operations to aid with signal detection. Techniques described by this disclosure can greatly enhance drive testing by providing a specific limited area in which to search for interference, which can greatly improve the accuracy and reduce the costs and time associated with identifying external interference sources.

An operator can use information from embodiments of this disclosure to deploy personnel to remedy the physical cause of interference, such as shutting down a rogue transmitter or repairing a sparking transformer. An operator may be a licensor of RF spectrum that operates a cellular telecommunications network. Furthermore, embodiments of the present disclosure can analyze and characterize interference without requiring network service interruptions, and without installing additional energy sensing equipment in network areas.

Embodiments relate to a method that detects and locates external interference source using network management data without having to measure and collect additional interference data using separate measurement devices. Based on network management data, such as CM (Configuration Management), PM (Performance Management) and Topology data, an embodiment creates hypothetical data for external interference and generates a probability heat map of possible locations of external interference source around the affected area. Embodiments may be implemented without details of transmitted interference signals, and diminish the impact of fading and shadowing in a radio environment, so that a location of external interference can be identified with a high degree of accuracy. Highly accurate location data may be obtained by accounting for antenna gain in three dimensions, as well as whether a line of sight condition is present between antennas that detect interference and potential locations of the interference source.

What is claimed is:

1. A method for locating a source of interference external to a wireless telecommunications network, the method comprising:
    assigning first and second elevation values to each pixel in a grid of pixels that represents an area associated with a plurality of cellular antennas; and
    calculating at least one probability value that the source of interference external to the wireless telecommunications network is located at an associated pixel by calculating respective probability values for pixels in the grid using the first elevation value and the second elevation value of the associated pixel and vertical gain values for each of the plurality of cellular antennas.

2. The method of claim 1, wherein the first elevation values are elevation values of a ground level, and the second elevation values are greater than the first elevation values for each pixel.

3. The method of claim 1, wherein calculating the at least one probability includes calculating a first probability value using the first elevation value of the associated pixel, and calculating a second probability value using the second elevation value of the associated pixel.

4. The method of claim 1, further comprising:
    providing a first probability value for the first elevation value of the associated pixel; and
    providing a second probability value for the second elevation value of the associated pixel.

5. The method of claim 1, wherein calculating the respective probability values further comprises:
    calculating vertical angle of arrival values between the plurality of cellular antennas and the pixels in the grid by comparing elevations of the cellular antennas to the first and second elevation values for the pixels in the grid.

6. The method of claim 5, wherein calculating the vertical angle of arrival values includes determining vertical mechanical tilt values for the plurality of cellular antennas.

7. The method of claim 5, wherein calculating the respective probability values further comprises:
    calculating horizontal angle of arrival values between the plurality of cellular antennas and the pixels in the grid.

8. The method of claim 7, wherein calculating the horizontal angle of arrival values includes determining a horizontal pointing direction for each of the plurality of cellular antennas.

9. The method of claim 1, wherein the respective probability values for pixels in the grid are calculated using signal strength measurements from the cellular antennas.

10. The method of claim 1, wherein calculating the respective probability values includes determining a hypothetical interference value for the pixels in the grid using the first and second elevation values and the vertical gain, and comparing the hypothetical interference value to a measured signal strength value for each elevation value.

11. The method of claim 1, further comprising:
    providing a heat map indicating probability values of at least a portion of the pixels in the grid.

12. An apparatus comprising:
    one or more processors, and
    memory storing instructions that, when executed by the one or more processors, cause the apparatus to:
    assign first and second elevation values to each pixel in a grid of pixels that represents an area associated with a plurality of cellular antennas; and
    calculate at least one probability value that the source of interference external to the wireless telecommunications network is located at an associated pixel by calculating respective probability values for pixels in the grid using the first elevation value and the second elevation value of the associated pixel and vertical gain values for each of the plurality of cellular antennas.

13. The apparatus of claim 12, wherein the first elevation values are elevation values of a ground level, and the second elevation values are greater than the first elevation values for each pixel.

14. The apparatus of claim 12, wherein the one or more processors further cause the apparatus to, when calculating the respective probability values:
    calculate a first probability value using the first elevation value of the associated pixel, and calculating a second probability value using the second elevation value of the associated pixel.

15. The apparatus of claim 12, wherein the one or more processors further cause the apparatus to:
    provide a first probability value for the first elevation value of the associated pixel; and
    provide a second probability value for the second elevation value of the associated pixel.

16. The apparatus of claim 12, wherein the one or more processors further cause the apparatus to, when calculating the respective probability values:
  calculate vertical angle of arrival values between the plurality of cellular antennas and the pixels in the grid by comparing elevations of the cellular antennas to the first and second elevation values for the pixels in the grid.

17. The apparatus of claim 16, wherein the one or more processors further cause the apparatus to, when calculating the vertical angle of arrival values:
  determine vertical mechanical tilt values for the plurality of cellular antennas.

18. The apparatus of claim 16, wherein the one or more processors further cause the apparatus to, when calculating the respective probability values:
  calculate horizontal angle of arrival values between the plurality of cellular antennas and the pixels in the grid.

19. The apparatus of claim 12, wherein the respective probability values for pixels in the grid are calculated using signal strength measurements from the cellular antennas.

20. The apparatus of claim 12, wherein the respective probability values are calculated using a hypothetical interference value for the pixels in the grid using the first and second elevation values and the vertical gain, and by comparing the hypothetical interference value to a measured signal strength value for each elevation value.

* * * * *